United States Patent
Sato et al.

(10) Patent No.: US 7,119,932 B2
(45) Date of Patent: Oct. 10, 2006

(54) IMAGE SCANNING SYSTEM AND METHOD

(75) Inventors: Yuichi Sato, Kanagawa (JP); Yasuyuki Oiwa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 825 days.

(21) Appl. No.: 09/909,196

(22) Filed: Jul. 19, 2001

(65) Prior Publication Data

US 2002/0054383 A1 May 9, 2002

(30) Foreign Application Priority Data

Jul. 19, 2000 (JP) ............................ 2000-218991
Jul. 19, 2000 (JP) ............................ 2000-219015

(51) Int. Cl.
 *H04N 1/04* (2006.01)
(52) U.S. Cl. ...................... 358/474; 358/504; 358/475; 382/167; 382/122
(58) Field of Classification Search ................ 358/504, 358/518, 474, 475, 486, 487, 498; 382/167, 382/122, 315
See application file for complete search history.

(56) References Cited

U.S. PATENT DOCUMENTS 5,991,055 A * 11/1999 Haselby et al. ............. 358/509
6,032,864 A * 3/2000 Hamasuna ............. 235/462.25
6,134,030 A 10/2000 Kaneko et al.
6,141,043 A * 10/2000 Suzuki et al. ............. 348/211.2
6,295,140 B1 * 9/2001 Kameyama ................. 358/461
6,359,706 B1 * 3/2002 Arita et al. ................. 358/486
6,421,146 B1 * 7/2002 Yoo ............................ 358/461
6,642,943 B1 * 11/2003 Machida ..................... 715/763
6,646,766 B1 * 11/2003 Suzuki et al. ............... 358/474
6,667,817 B1 * 12/2003 Stocker ...................... 358/475
6,704,457 B1 * 3/2004 Sugiura ...................... 382/274
6,792,161 B1 * 9/2004 Imaizumi et al. ........... 382/275
6,836,344 B1 * 12/2004 Koide et al. ................. 358/1.9
2002/0057470 A1 * 5/2002 Koide et al. ................. 358/513

FOREIGN PATENT DOCUMENTS

JP 11 275310 10/1999

* cited by examiner

*Primary Examiner*—Douglas Q. Tran
*Assistant Examiner*—Negussie Worku
(74) *Attorney, Agent, or Firm*—Morgan & Finnegan, LLP

(57) ABSTRACT

In an image scanning system which can scan an image in a plurality of scanning modes, and has a memory for storing a correction data file which has correction data for each of the plurality of scan modes, correction data corresponding to a scan mode of a given image scan operation is read out from the memory upon scanning an image, and an image scan is executed using the readout correction data. If correction data corresponding to the scan mode of that image scan operation is not stored in the memory, correction data corresponding to the scan mode is generated, and is stored in the memory.

19 Claims, 17 Drawing Sheets

IMAGE SCANNING SYSTEM AND METHOD

FIELD OF THE INVENTION

The present invention relates to an image scanning system and method and, more particularly, to an image scanning system and method, which scan an image using an image scanning apparatus having a plurality of scan modes for scanning an image on a document illuminated by a light source under different conditions.

BACKGROUND OF THE INVENTION

In a conventional image scanning apparatus, when the output level of an image sensor has varied due to a change in utilization environment of the apparatus or aging, the tone and color reproducibility of a scanned image becomes unstable and deteriorates. To solve this problem, an image scanning apparatus which can realize stable and high tone and color reproducibility even when the output level of the image sensor has varied due to a change in utilization environment of the apparatus or aging has been proposed (e.g., Japanese Patent Application Laid-Open No. 11-275310).

In the image scanning apparatus described in Japanese Patent Application Laid-Open No. 11-275310, upon scanning a document, a reference white background is scanned for each color light source prior to the beginning of the document scan, the output signal from the image sensor upon scanning the reference white background is converted into digital image data by an A/D converter, and it is checked if the maximum value of that image data falls within a predetermined range. If the maximum value of the image data falls outside the predetermined range, light amount adjustment of the corresponding light source is redone. More specifically, even when the output level of the image sensor has varied due to a change in utilization environment of the apparatus or aging, since the aforementioned process is executed occasionally upon scanning a document image, an image scan with stable and high tone and color reproducibility is realized.

On the other hand, as the image scanning apparatus has higher resolution, a buffer memory for an image process requires a large-capacity memory element. It is advantageous for power savings and a cost reduction to use a DRAM. However, since the access speed of the DRAM is lower than an SRAM, it may bottleneck the scan time. Such low access speed may sacrifice the scan time when a low-resolution scan is made using a high-resolution image sensing element.

To solve this problem a method of executing an image process for assuring an access time to the DRAM after image data is converted into the number of pixels corresponding to the scan resolution has been proposed. In this method, the drive speed of the image sensing element is changed for each scan mode, and a low-resolution scan can be done within a short period of time.

However, in the aforementioned method, since the drive speed of the image sensing element changes depending on the scan mode, fixed pattern noise caused by distortion of an analog signal and the dark current of the image sensing element changes. For this reason, to strictly execute shading correction, shading data must be acquired for each scan mode, and shading correction must be done based on that data.

In case of an image scanning apparatus using a high-resolution (e.g., 1200DPI) image sensing element, scan modes for resolutions of, e.g., 75DPI, 150DPI, 300DPI, 600DPI, and 1200DPI should be prepared by hardware in both color and gray modes. For this purpose, calibration data and shading data for each scan mode must be prepared. However, since the number of types of scan modes is large, several minutes to about 10 minutes may be required to collectively acquire these data in the first scan.

On the other hand, calibration data and shading data may be acquired for each scan. However, a longer time is required for each scan as the resolution increases.

SUMMARY OF THE INVENTION

The present invention has been made in consideration of the above situation, and has as its object to provide an image scanning system which can quickly acquire shading data and the like even when many different reading modes are used, and an image scanning method in that image scanning system.

According to the present invention, the foregoing object is attained by providing an image scanning system capable of scanning an image in a plurality of scan modes, comprising: a memory for storing a correction data file having correction data for each of the plurality of scan modes; and a controller for checking upon scanning an image if correction data corresponding to a scan mode of that image scan operation is stored in the memory, and if the correction data is not stored, controlling to generate correction data corresponding to the scan mode, to execute an image scan using the generated correction data.

According to an aspect of the present invention, the aforesaid system further comprises a selector for selecting a desired one of the plurality of scan modes.

Preferably, the image scanning system is constructed by connecting to one of a plurality of different image sensing apparatuses, the memory stores the correction data file for each of the plurality of different image sensing apparatuses, and the controller independently controls for each of the plurality of different image sensing apparatuses.

According to the present invention, the foregoing object is also attained by providing an image scanning method in an image scanning system which can scan an image in a plurality of scan modes, and has a memory for storing a correction data file having correction data for each of the plurality of scan modes, comprising: a first checking step of checking upon scanning an image if correction data corresponding to a scan mode of the image scan operation is stored in the memory; a step of, when the correction data corresponding to the scan mode is not stored, generating correction data corresponding to the scan mode; and a step of executing an image scan using the generated correction data.

According to an aspect of the present invention, the aforesaid method further comprises a selection step of selecting a desired one of the plurality of scan modes.

Preferably, the image scanning system is constructed by connecting to one of a plurality of different image sensing apparatuses, the memory stores the correction data file for each of the plurality of different image sensing apparatuses, and the steps are independently executed for each of the plurality of different image sensing apparatuses.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings. Note that the present invention can be practiced in the form of a method supported by the descriptions of the embodiments.

<First Embodiment>

Figure 1:
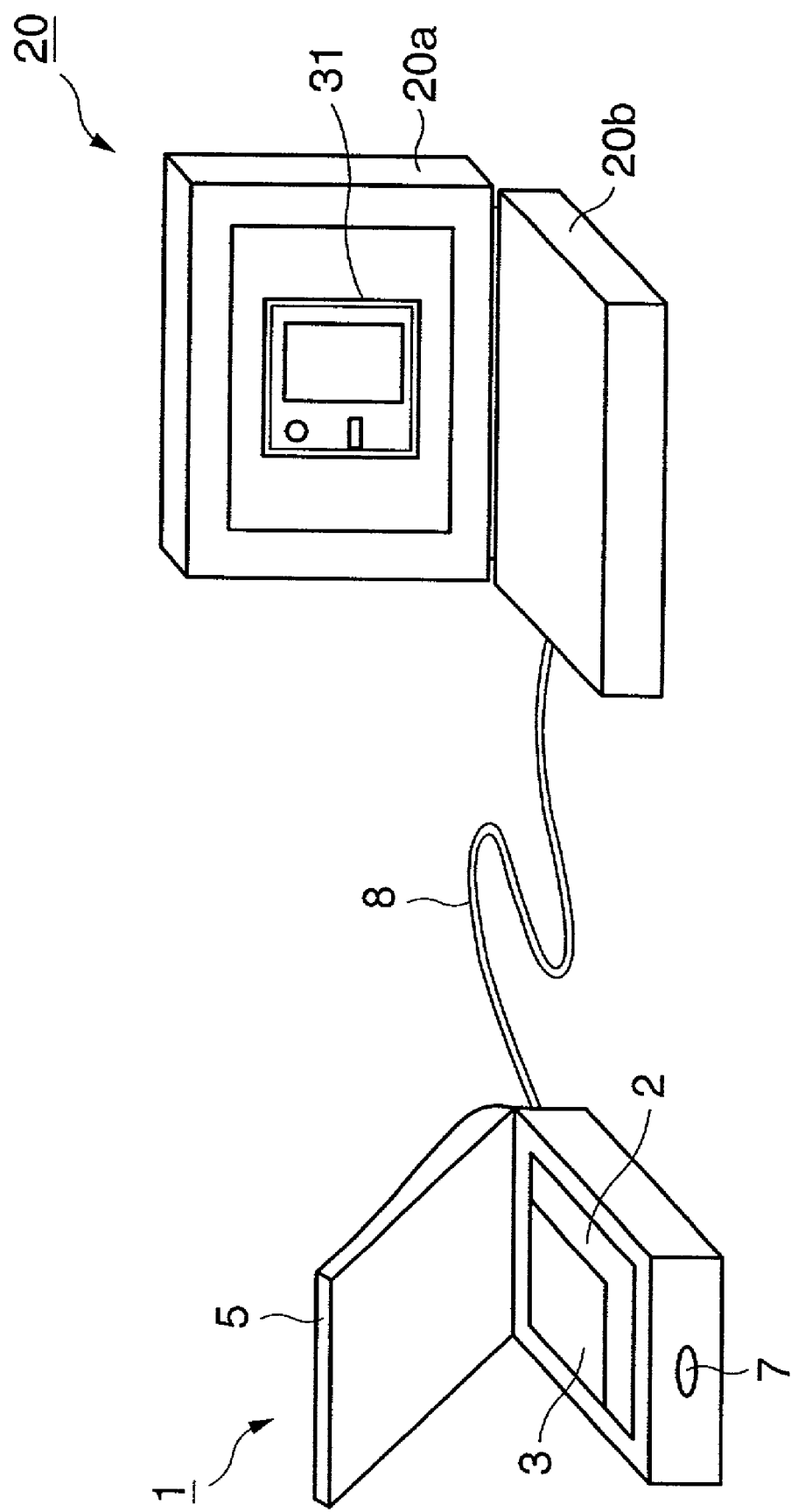
FIG. 1 is a schematic view showing an outer appearance of an image scanning system according to a first embodiment of the present invention.

FIG. 1 is a schematic view showing the arrangement of an image scanning system according to the first embodiment of the present invention.

The image scanning system comprises an image scanning apparatus 1, and a host computer 20 that connects the image scanning apparatus 1 via a USB cable 8, as shown in FIG. 1. The image scanning apparatus 1 comprises a platen glass 2 on which a document 3 to be scanned is placed, a pressing plate 5 for holding a document on the platen glass 2, and a start button 7 used to launch an application and to instruct the start of a scan. The host computer 20 has a display 20a for displaying an operation screen 31 of application software and the like, a main body 20b including a CPU, ROM, RAM, hard disk, various I/O interfaces, and the like, and an input device (not shown) such as a mouse, keyboard, and the like.

Figure 6:
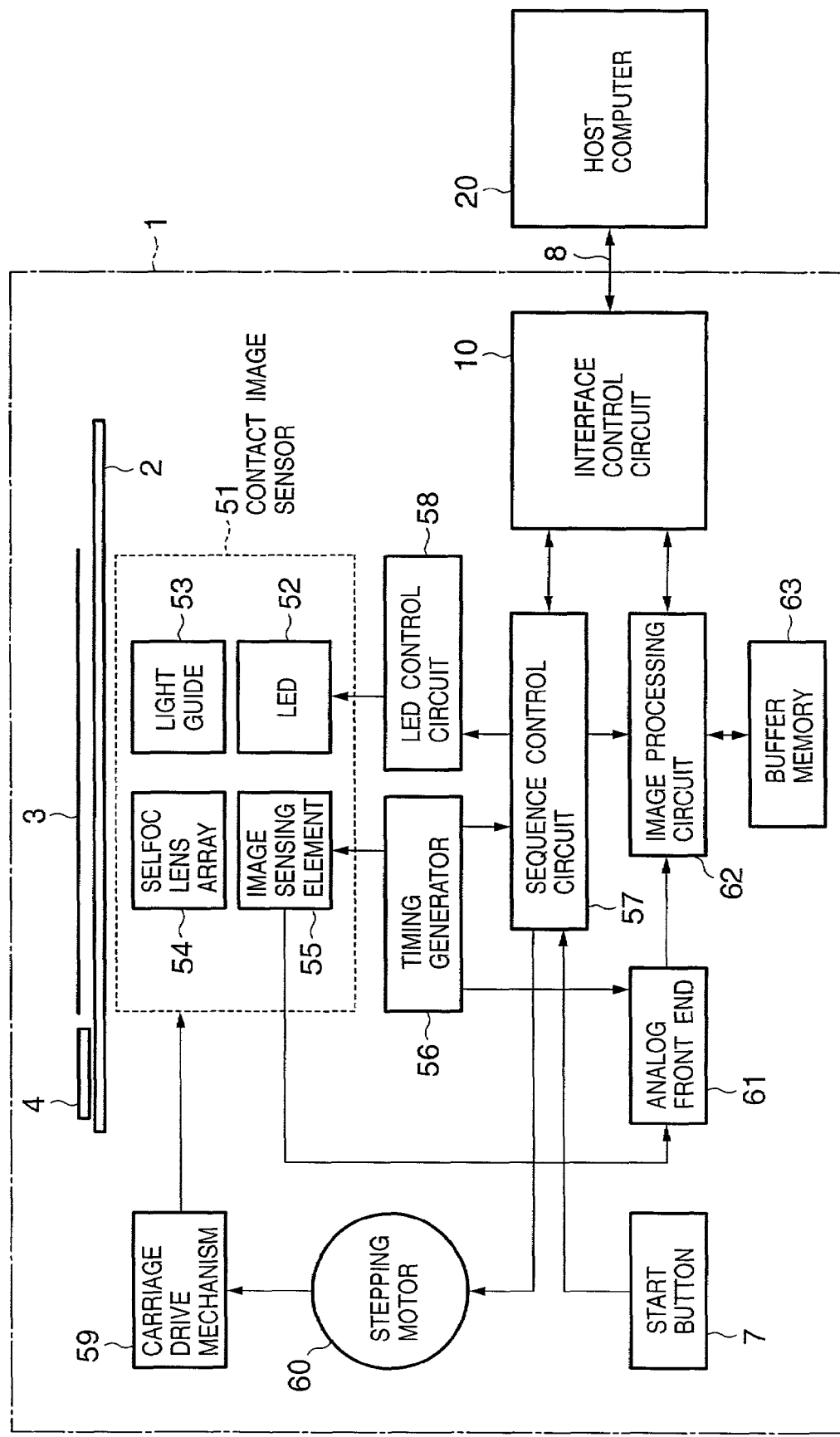
FIG. 6 is a block diagram showing an internal arrangement of an image scanning apparatus according to the first embodiment of the present invention.

The detailed arrangement of the image scanning apparatus 1 will be described below with reference to FIG. 6. FIG. 6 is a block diagram showing the arrangement of the image scanning apparatus 1 used in the image scanning system shown in FIG. 1, and the same reference numerals in FIG. 6 denote the same parts as in FIG. 1.

As shown in FIG. 6, the image scanning apparatus 1 comprises a sequence control circuit 57 for making control that pertains to a scan operation in synchronism with drive clocks generated by a timing generator 56, and a contact image sensor 51 for scanning an image on a document 3 placed on the platen glass 2. Note that a reference white plate 4 used to acquire white shading data is provided on the platen glass 2.

More specifically, the sequence control circuit 57 executes a series of sequence control processes such as control of a stepping motor 60, ON/OFF control of an LED 52, and the like in accordance with a setup value set by the host computer 20 via an interface control circuit 10.

The contact image sensor 51 comprises the LED 52 for illuminating a document 3, a light guide 53 for guiding light emitted by the LED 52 toward the document 3, an image sensing element 55, and a SELFOC lens array 54 for guiding light reflected by the document 3 toward the imaging surface of the image sensing element 55. The image sensing element 55 is driven in synchronism with drive clocks generated by the timing generator 56, converts an optical image formed on its imaging surface into an electrical signal, and outputs the electrical signal. The LED 52 undergoes ON/OFF control by an LED control circuit 58, which controls to turn on/off the LED 52 in accordance with an instruction from the sequence control circuit 57.

The contact image sensor 51 is driven in the sub-scan direction by a carriage drive mechanism 59 using the stepping motor 60 as a driving source. The stepping motor 60 is driven by the sequence control circuit 57 on the basis of a setup value set by the host computer 20 via the interface control circuit 10. Note that the setup value includes the pulse speed, rotational direction, and the like of the stepping motor 60.

The electrical signal output from the image sensing element 55 of the contact image sensor 51 is input to an analog front end (AFE) 61. The analog front end 61 comprises an analog circuit including an A/D converter for sampling the electrical signal from the image sensing element 55 and converting it into a digital signal in synchronism with the drive clocks from the timing generator 56.

The digital signal output from the analog front end 61 is input to an image processing circuit 62, which generates image data by applying image processes such as shading correction, gamma correction, zoom process, and the like to the input digital signal. The image processes use the setup value set by the sequence control circuit 57. Upon executing the image processes, a buffer memory 63 is used as a work area, and stores image data that has undergone the image processes.

The image data stored in the buffer memory 63 is transferred to the host computer 20 via the image processing circuit 62 and interface control circuit 10. The interface control circuit 10 is an interface circuit complying with the USB (Universal Serial Bus) specification, and is connected to the host computer 20 via the USB cable 8.

Figure 2:
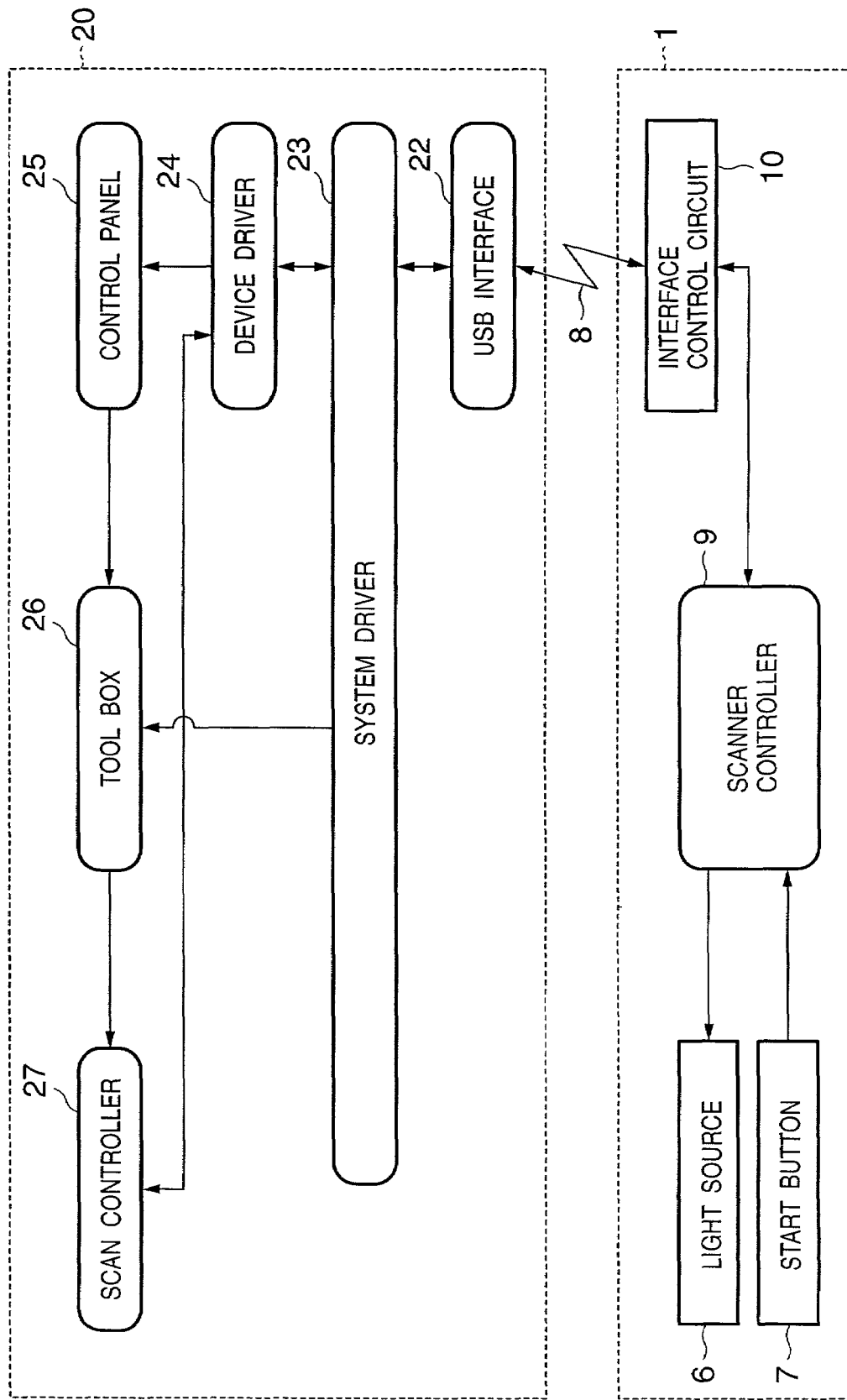
FIG. 2 is a block diagram showing a system configuration of software according to the first embodiment of the present invention.
Figure 3:
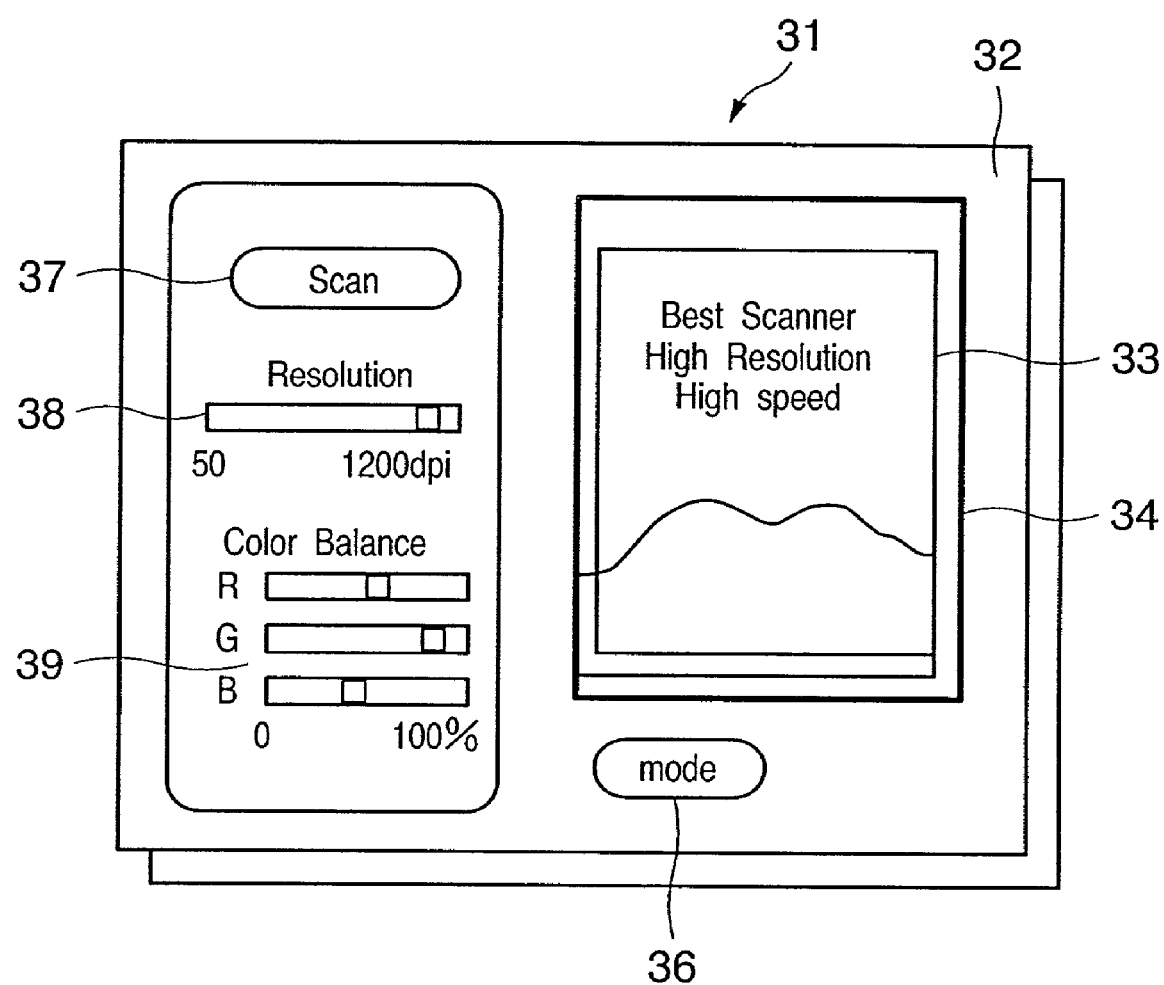
FIG. 3 shows an operation screen according to the first embodiment of the present invention.

The system configuration of software in the image scanning system will be described below with reference to FIGS. 2 and 3. FIG. 2 is a block diagram showing the system configuration of software in the image scanning system in FIG. 1, and FIG. 3 shows an example of the operation screen displayed by a scan controller 27 in FIG. 2.

In the image scanning apparatus 1, as shown in FIG. 2, a scanner controller 9 is implemented by software installed in advance. The scanner controller 9 executes ON/OFF control of a light source 6 (LED 52 shown in FIG. 6), fetches a start signal generated upon depression of the start button 7, and so forth. Also, the scanner controller 9 exchanges data with the host computer 20 via the interface control circuit 10.

The host computer 20 has a USB interface 22 connected to the USB cable 8. In the host computer 20, system software (e.g., Windows 2000; the tradename of Microsoft Corporation) and scanner application software implement a system driver 23 for controlling respective resources, a device driver 24 for controlling the image scanning apparatus 1, a control panel 25 for managing the operation environment (e.g., to launch/quit application software) on the host computer 20, a tool box 26 for controlling application software for the image scanning apparatus 1 on the host computer 20, and a scan controller 27 for making an operation associated with an image scan by the image scanning apparatus 1.

When the image scanning apparatus 1 and host computer 20 are connected via the USB cable 8, enumeration is done to determine the communication speed to be used between their interfaces. After the communication speed is determined, the interface control circuit 10 of the image scanning apparatus 1 operates at that determined communication speed. Also, the USB interface 22 of the host computer 20 similarly operates at the determined communication speed.

After the communication speed is determined, the device driver 24 of the host computer 20 switches the setup values in the image processing circuit 62 shown in FIG. 6 or switches the control of the sequence control circuit 57.

If a high communication speed is set, the image processing circuit 62 is set to bypass all image processes (shading correction, gamma correction, and zoom process) of the image processing circuit 62, and to output 14-bit data output from the analog front end 61 to an internal data transfer FIFO of the interface control circuit 10. At this time, the timing generator 56 is set to generate the fastest drive clocks for the image sensing element 55. On the other hand, the device driver 24 is set to execute the image processes bypassed in the image processing circuit 62.

If a low communication speed is set, the image processing circuit 62 is set to enable all the image processes such as shading correction, gamma correction, and zoom process, and to output 8-bit data output from the image processing circuit 62 to the internal data transfer FIFO of the interface control circuit 10. At this time, the timing generator 56 is set to generate drive clocks corresponding to the communication speed of the interface to the image sensing element 55.

Upon depression of the start button 7, an interrupt signal instructs the scanner controller 9 of depression of the start button 7, and the scanner controller 9 sends information indicating that "the start button 7 has been pressed" from the interface control circuit 10 to the USB interface 22 of the host computer 20 via the USB cable 8.

The information indicating that "the start button 7 has been pressed" sent to the USB interface 22 is transferred to the device driver 24 via the system driver 23. The device driver 24 instructs the control panel 25 to launch the tool box 26. Upon receiving this instruction, the control panel 25 launches the tool box 26. When the tool box 26 recognizes that the start button 7 of the image scanning apparatus 1 has been pressed, it checks if the scanner controller 27 has already been launched. If the scanner controller 27 has not been launched yet, the scanner controller 27 is launched.

The scanner controller 27 displays an operation screen that allows the user to make operations associated with the image scan by the image scanning apparatus 1 on the display 20a. For example, an operation screen 31 shown in FIG. 3 is displayed. This operation screen 31 is the one after preview, and a cursor 33 for cropping, a preview window 34, a mode setup button 36 used to set a scan mode including gamma characteristics (density characteristic curve) and the like, a main scan start button 37, a resolution setup bar 38, and color balance setup bars 39 are displayed within this window 32.

By clicking a button or dragging a bar using a mouse or the like (not shown) on this operation screen 31, a setup is made, and a scan start instruction is issued.

Figure 4:
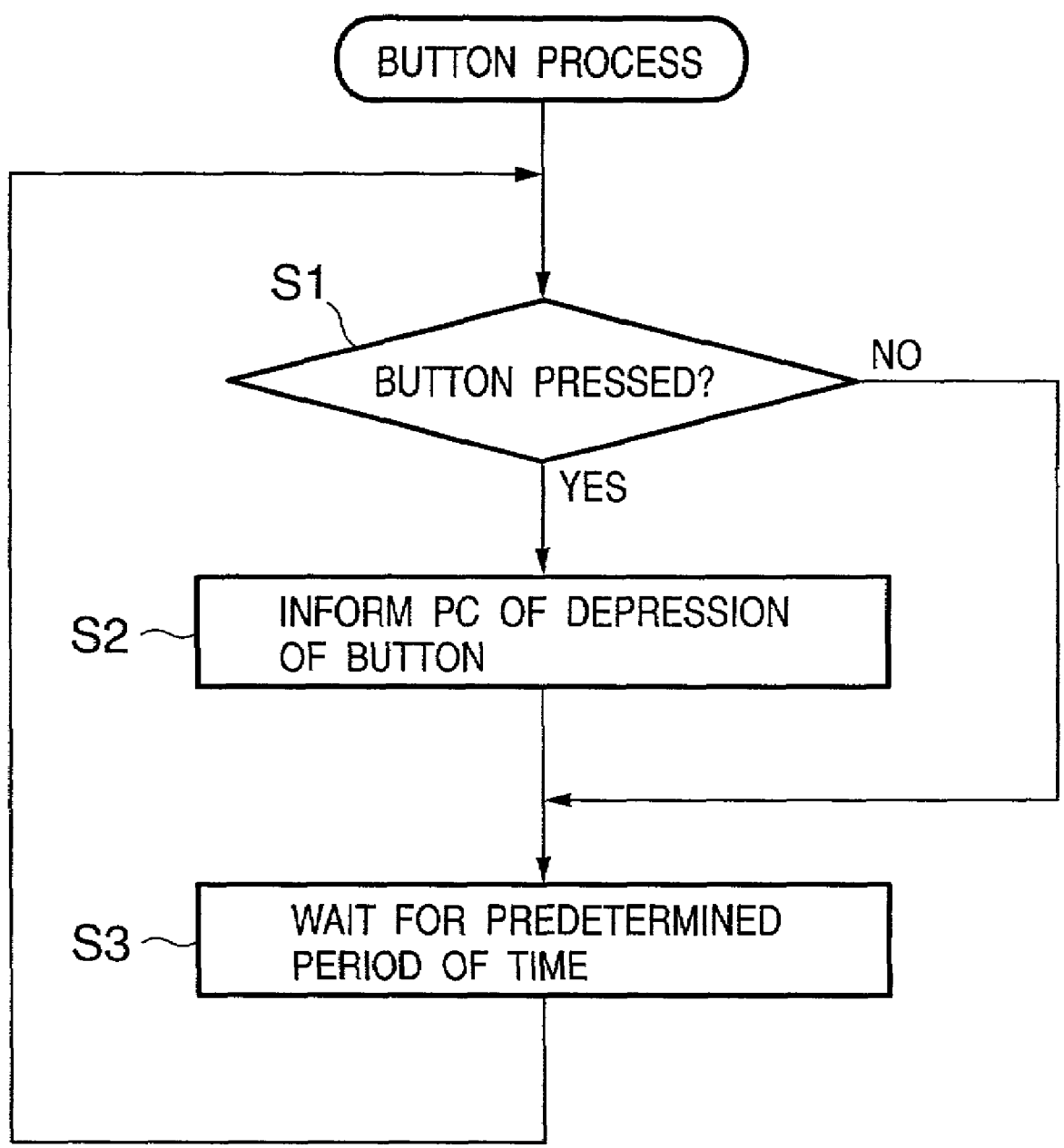
FIG. 4 is a flow chart showing a sequence upon launching an application according to the first embodiment of the present invention.

The process for informing the host computer 20 of depression of the start button 7 in the image scanning apparatus 1 will be explained below with reference to FIG. 4. FIG. 4 is a flow chart showing the button process of the image scanning apparatus 1. Note that the scanner controller 27 periodically checks the button.

The scanner controller 9 of the image scanning apparatus 1 executes a button process for informing the host computer 20 of depression of the start button 7. This button process is implemented by polling.

When this button process starts, it is checked in step S1 in FIG. 4 if the start button 7 has been pressed. If the pressed state of the start button 7 continues for a predetermined period of time after the start button 7 is not pressed for a predetermined period of time, it is determined that the start button 7 has been pressed. If the start button 7 has not been pressed, the flow jumps to step S3 to start a timer, and the flow returns to step S1 after the control waits for a predetermined period of time (e.g., 10 msec).

If the start button 7 has been pressed, the flow advances to step S2, information indicating that the start button 7 has been pressed is sent to the host computer 20. In step S3, the timer is started, and the control waits for a predetermined period of time (e.g., 10 msec). After that, the flow returns to step S1.

Note that it can be determined that the start button 7 has been pressed when the button is not pressed for a predetermined period of time after the button has been pressed for a predetermined period of time in step S1. The button process may be implemented by a hardware interrupt using a button signal.

In the above description, the button process is implemented by polling but may be implemented by a hardware interrupt using a button signal.

Figure 5:
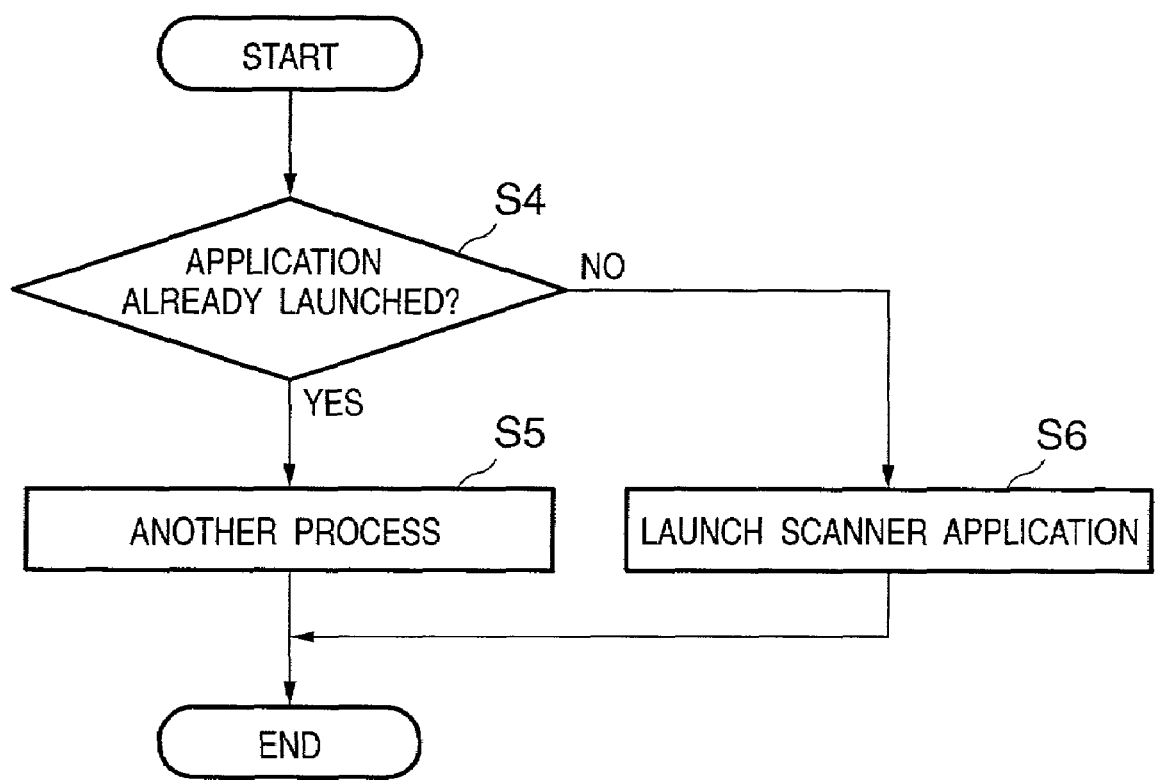
FIG. 5 is a flow chart showing a processing sequence of a tool box according to the first embodiment of the present invention.

The process of the tool box 26 on the host computer 20 will be described blow with reference to FIG. 5. FIG. 5 is a flow chart showing the processing sequence of the tool box 26 on the host computer 20.

When the tool box 26 is launched by the control panel 25, it is checked in step S4 (FIG. 5) if the scan controller 27 has already been launched. If the scan controller 27 has already been launched, the flow advances to step S5 to execute a process corresponding to another launch factor, thus ending this processing. On the other hand, if the scan controller 27 has not been launched yet, the flow advances to step S6 to launch the scan controller 27, thus ending this processing.

Figure 7:
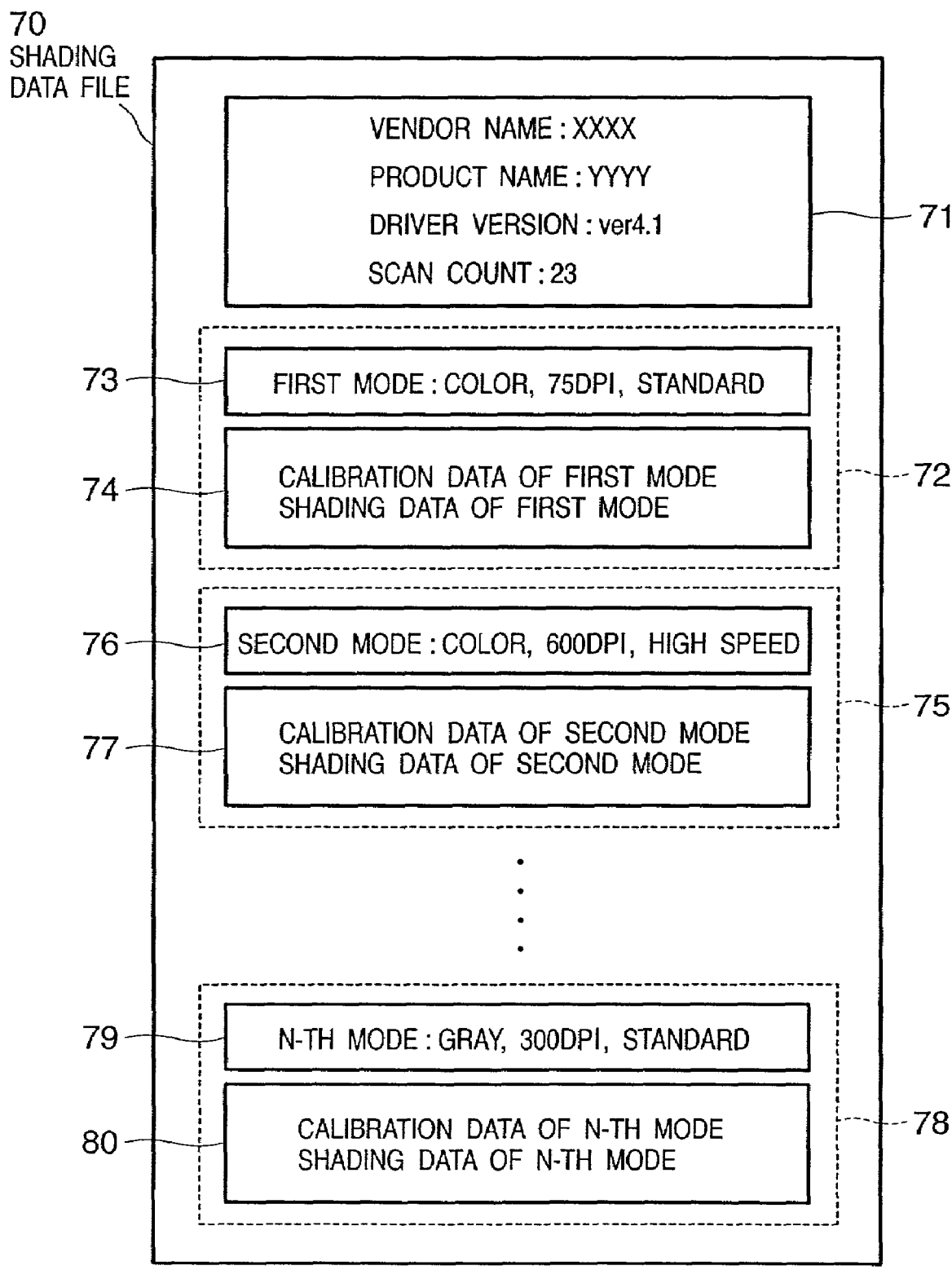
FIG. 7 shows a format of a shading data file according to the first embodiment of the present invention.

The format of a shading data file used in the first embodiment will be described below with reference to FIG. 7. FIG. 7 shows the format of a shading data file used in the image scanning system shown in FIG. 1.

In this embodiment, a shading data file 70 shown in FIG. 7 is used, and its file name is "Shading Data File.dat". The shading data file 70 comprises header information 71, and shading data records 72, 75, and 78 corresponding to respective scan modes. Each of the records 72, 75, and 78 consists of a sub-header that describes the corresponding scan mode, and data containing calibration data and shading data corresponding to that scan mode.

The shading data file 70 is generated by the device driver 24, and is stored in a hard disk (not shown) of the host computer 20. The device driver 24 also manages the shading data file 70. If a shading data file containing incompatible header information is found, the device driver 24 deletes that file.

The header information 71 contains a vendor name "XXXX", product name "YYYY", driver version "ver4.1", and scan count "23", and can specify a compatible image scanning apparatus and driver version.

The header information 71 is used to check if the shading data file 70 of interest matches the current device driver 24, prior to an image scan operation (to be described later).

The scan count is counted up by the device driver 24 for each scan independently of the scan mode selected. This value is used to cope with shading of the contact image sensor 51 and a change in luminance of the LED 52 as an elapse of time, and the device driver 24 deletes a shading data file when the scan count has reached 100. In this manner, the calibration data and shading data are updated every time the scan count has reached 100. In place of deleting the shading data file, all records except for the header may be deleted.

The record 72 of a first scan mode comprises a header 73 and data 74. The header 73 contains "color", "75DPI", and "standard scan", and data of this record specifies the corresponding scan mode. Note that "standard scan" indicates that the interface speed is full speed (12 Mbps), and that R, G, and B 8-bit data are output.

Calibration data in the data 74 corresponding to the first scan mode specifies a value used to control the ON time of each color LED 52, and its shading data contains dark shading data and white shading data corresponding to the first scan mode. The device driver 24 downloads these data to the buffer memory 63 of the image scanning apparatus 1 via the image processing circuit 62 for each scan.

A second scan mode is a "color", "600DPI", and "high-speed scan" mode, and the record 75 corresponding to this second scan mode similarly contains a header 76 and data 77. Note that "high-speed scan" indicates that the interface speed is high speed (480 Mbps), and that R, G, and B 16-bit data are output. In the second scan mode, since the device driver 24 sets the image processing circuit 62 in the high-speed scan mode in an actual operation, the image processing circuit 62 does not execute shading correction. Hence, shading data is not downloaded to the buffer memory 63, and the device driver 24 makes shading arithmetic operations.

An N-th scan mode is a "gray", "300DPI", and "standard scan" mode, and the record 78 corresponding to the N-th scan mode similarly contains a header 79 and data 80. Note that "gray" is a mode for outputting G (green) monochrome image data, and since "standard scan" is selected, 8-bit data is output.

In the first embodiment, upon executing a scan mode selected at the image scanning apparatus 1, it is checked if the shading data file that contains shading data corresponding to the respective scan modes of the image scanning apparatus 1 contains shading data which corresponds to the selected scan mode, and it is determined based on the checking result if shading data is to be generated. If the shading data file does not contain any shading data corresponding to the selected scan mode, it is determined that shading data is to be generated. If it is determined that shading data is to be generated, shading data corresponding to the selected scan mode is generated, and the generated shading data is stored in the shading data file in correspondence with the selected scan mode. If the shading data file is not compatible to the image scanning apparatus 1, that file is deleted, and a new shading data file compatible to the image scanning apparatus 1 is generated. Detailed contents of this process will be described later.

Figure 8:
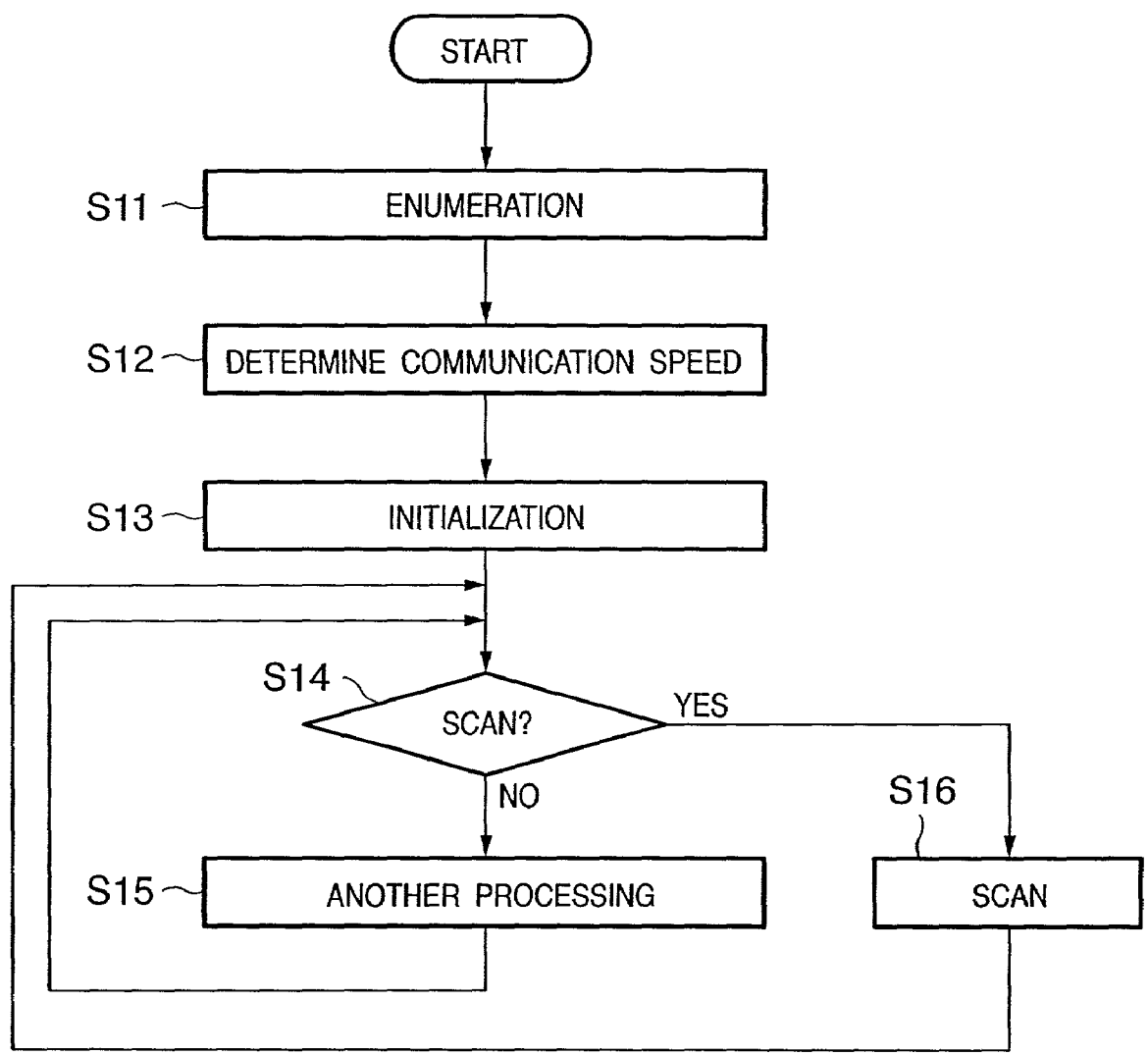
FIG. 8 is a flow chart showing a control sequence after a scanner control program is launched according to the first embodiment of the present invention.

The control on the host computer 20 in this image scanning system will be explained below with reference to FIG. 8. FIG. 8 is a flow chart showing the control sequence on the host computer 20 in the image scanning system shown in FIG. 1.

If the USB cable 8 is connected or the power switch of the host computer 20 is turned on, enumeration is done in step S11 (FIG. 8) to recognize a device connected to the USB interface 22 via the USB cable 8, to assign addresses, and to determine the communication speed. The flow advances to step S12, and the device driver 24 measures an effective communication speed between the host computer 20 and image scanning apparatus 1. The flow advances to step S13, and the device driver 24 initializes the respective circuits of the image scanning apparatus 1 in correspondence with the communication speed. In this initialization, a clock is set in the timing generator 56 on the basis of the effective communication speed, and the contact image sensor 51 is returned to its home position.

The flow then advances to step S14 to check if an instruction issued by the scan controller 27 is a scan start instruction. If the instruction is a scan start instruction, the flow advances to step S16 to start a scan. The contents of the scan process will be described later.

If the instruction is not a scan start instruction, the flow advances to step S15 to execute a process in accordance with that instruction.

Figure 9:
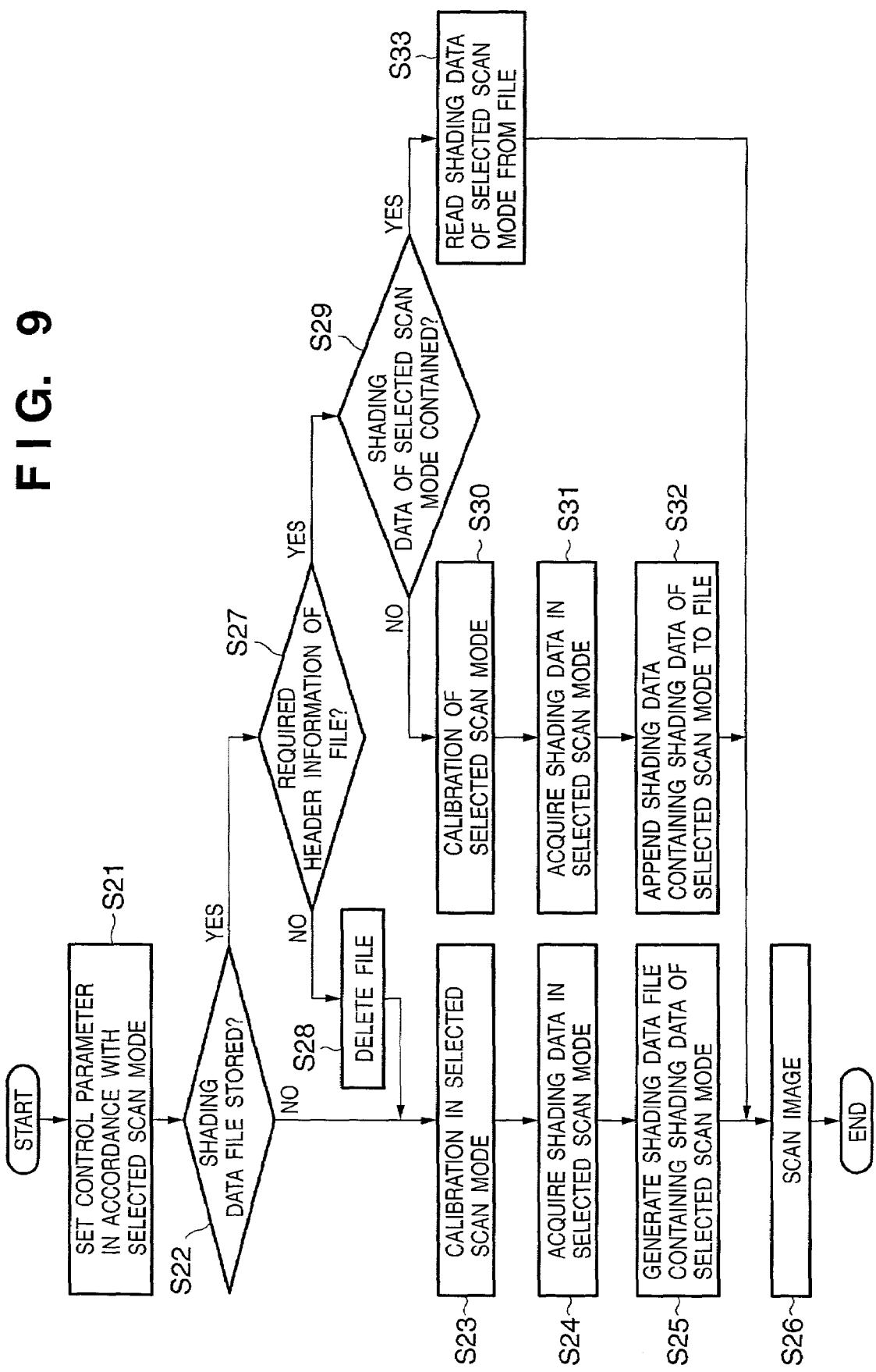
FIG. 9 is a flow chart showing a control sequence after a scan starts according to the first embodiment of the present invention.

The control sequence of the device driver 24 after the scan start will be explained below with reference to FIG. 9. FIG. 9 is a flow chart showing the control sequence of the device driver 24 after the scan start in the image scanning system shown in FIG. 1.

When the scan starts, the device driver 24 sets control parameters of the respective units on the basis of the scan mode selected by the scan controller 27 in step S21 (FIG. 9), and searches for a shading data file with a file name "Shading Data File.dat" in step S22. If such shading data file is not found, the flow advances to step S23.

Calibration in the selected scan mode is done in step S23, and the control is made to acquire shading data of that scan mode in step S24. Note that the shading data of the selected scan mode are averaged to reduce the influences of random noise. That is, black shading data is obtained by scanning a plurality of lines, and averaging these data. White shading data is obtained by scanning the white reference plate 4 for 10 lines at a resolution of 150DPI in the sub-scan direction, comparing data of identical pixels, and averaging the six largest data of the scan data.

The flow advances to step S25 to generate a shading data file with a file name "Shading Data File.dat". More specifically, a file with a file name "Shading Data File.dat" is opened on a RAM (not shown) of the host computer 20, and header information is written in that file. Then, a sub-header of the current scan mode is written in that file, and calibration data obtained in step S23 and shading data obtained in step S24 are written. The file is saved in the hard disk of the host computer 20. In this manner, the shading data file containing the shading data is generated.

The flow advances to step S26 to control to execute an image scan in the selected scan mode. In this process, scan parameters are set in the image scanning apparatus 1 in accordance with calibration data corresponding to the selected scan mode, and shading data are downloaded to the buffer memory 63. After that, the scan count contained in the header information of the shading data file is incremented by 1. After various setups, the image scanning apparatus 1 starts the scan, and sends scanned image data to the host computer 20. The device driver 24 makes arithmetic operation of the received image data in accordance with the processing contents set on the operation screen 31 to generate a file of a final image. Then, this processing ends.

If the shading data file with a file name "Shading Data File.dat" is found in step S22, the flow advances to step S27 to check with reference to the header information of the file if the found shading data file is compatible to the device driver 24.

The contents of the header information 64 of the file contain a vendor name, product name, driver version, and scan count, and can specify the compatible image scanning apparatus and driver version, as described with reference to FIG. 7. For example, when the product name or driver version is different or when the scan count has exceeded a specific value, the device driver 24 determines that the file is not compatible.

Note that another determination method is available in step S27. That is, as for the driver version, since the compatibility of calibration data and shading data is not always lost even when the driver version has changed, compatibility may be determined by going back some previous versions. That is, a new driver itself has a list of driver versions of shading files which match the new driver, and if the driver version is contained in that list, it is determined that calibration data and shading data of that shading file can be used. In this case, the device driver 24 changes the driver version information contained in the header information of the shading file to the latest version.

If the found shading data file is not compatible to the device driver 24, the flow advances to step S28 to delete the found file, and the flow advances to step S23. A description of the processes from step S23 will be omitted since they have already been explained above.

If it is determined that the found shading data file is compatible to the device driver 24, the flow advances to step S29 to check if the shading data file contains shading data of the selected scan mode. If the file does not contain shading data of the selected scan mode, the flow advances to step S30. Calibration of the selected scan mode is done in step S30, and shading data of the selected scan mode are acquired in step S31. The flow advances to step S32 to write a sub-header of the selected scan mode, the calibration data obtained in step S30, and the shading data obtained in step S31 after the last record of the shading data file. The flow advances to step S26 to scan an image.

If it is determined in step S29 that the shading data file contains shading data corresponding to the selected scan mode, the flow advances to step S33 to read the calibration data and shading data corresponding to the selected scan mode from the file. The flow then advances to step S26 to scan an image.

As described above, according to the first embodiment, when calibration data and shading data are required for each scan mode, calibration data and shading data are acquired from the shading data file upon scanning in that scan mode, thus allowing a quick scan.

Since the second and subsequent scans in the identical scan mode use the calibration data and shading data acquired in the first scan, no extra time for acquiring such data is required.

As the shading data file for saving the calibration data and shading data is managed for each scan mode, and data are separately acquired in each scan mode, the extra time required upon the first scan can be reduced.

Since the shading data file is managed using the product name and driver version information, if the compatibility of shading data is lost upon changing the product name or driver, the shading data file can be automatically updated. Also, since the shading data file is managed based on the scan count, the scan characteristics can be prevented from changing due to a change in utilization environment or aging.

When the shading data file is not compatible to the image scanning apparatus, that file is deleted, and a new shading data file compatible to that image scanning apparatus is generated. Hence, if there is no shading data file compatible to the image scanning apparatus, a shading data file compatible to the image scanning apparatus can be easily generated without any extra processes.

<Second Embodiment>

The second embodiment of the present invention will be described below. Since the overall arrangement of an image scanning system is the same as that described in the first embodiment with reference to FIG. 1, a description thereof will be omitted.

Figure 10:
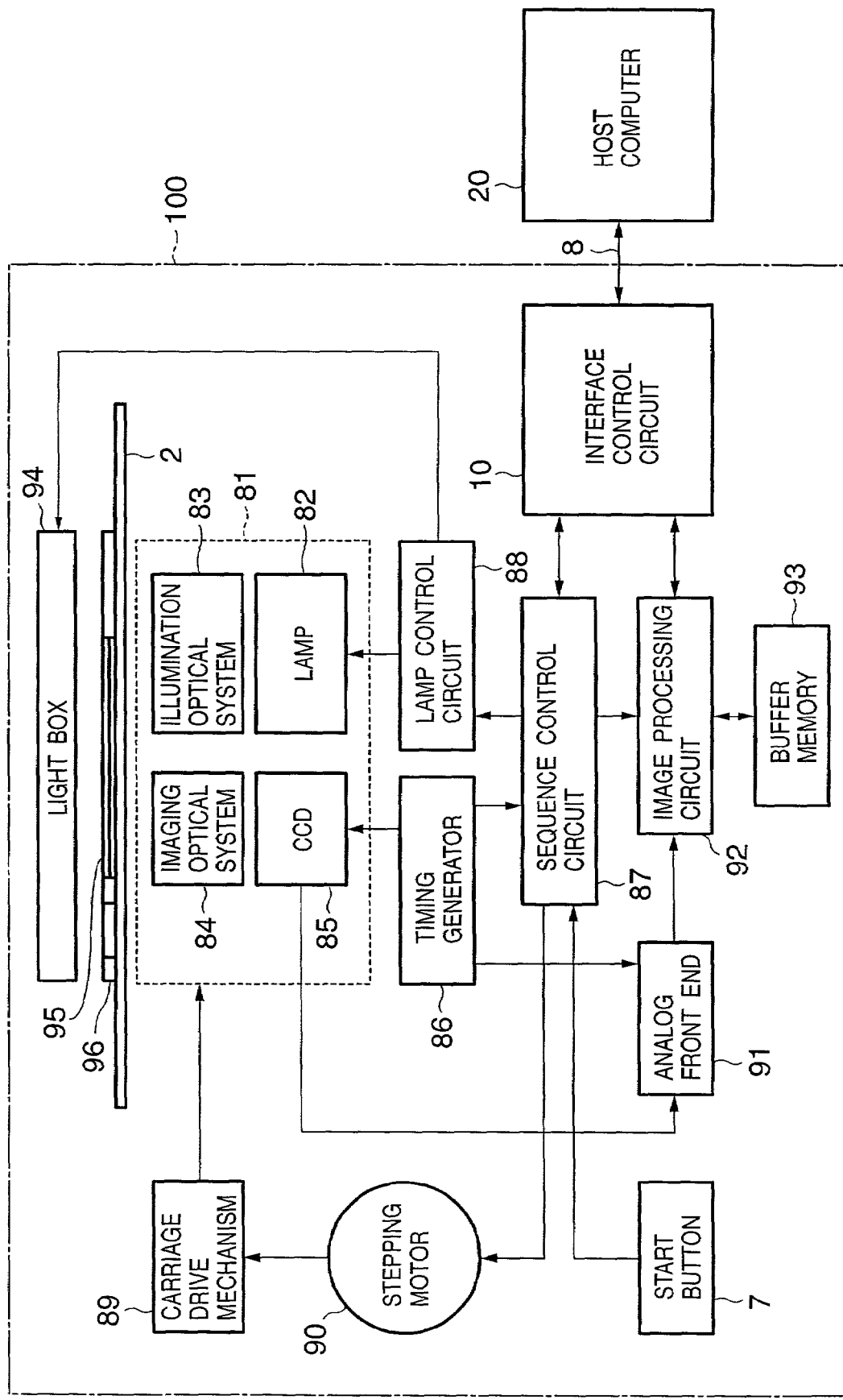
FIG. 10 is a block diagram showing an internal arrangement of an image scanning apparatus according to a second embodiment of the present invention.

FIG. 10 is a block diagram mainly showing the arrangement of an image scanning apparatus according to the second embodiment of the present invention, of the image scanning system shown in FIG. 1. Since the image scanning apparatus shown in FIG. 10 can read not only a reflecting document but also a transparent document, and has a detailed arrangement different from that in the first embodiment, it is denoted by reference numeral 100. Of the arrangement shown in FIG. 10, the same reference numerals denote the same parts as in FIG. 6, and a detailed description thereof will be omitted.

Referring to FIG. 10, the image scanning apparatus 100 comprises a sequence control circuit 87 for making control that pertains to a scan operation in synchronism with drive clocks generated by a timing generator 86, and a carriage 81 for scanning an image on a document placed on the platen glass 2 or an image of a transparent document 95 such as a film or the like held by a film holder 96.

More specifically, the sequence control circuit 87 executes a series of sequence control processes such as control of a stepping motor 90, ON/OFF control of a lamp 82 and a light box 94, and the like in accordance with a setup value set by the host computer 20 via the interface control circuit 10.

The carriage 81 has the lamp 82 for illuminating a reflecting document, an illumination optical system 83 for guiding light emitted by the lamp 82 toward a document, and an imaging optical system 84 for guiding light reflected by the reflecting document or light emitted by the light box 94 and transmitted through a transparent document to the image sensing surface of a CCD 85. The CCD 85 is driven in synchronism with drive clocks generated by the timing generator 86 to photoelectrically convert an optical image formed on the image sensing surface into an electrical signal, and to output the electrical signal. The lamp 82 is turned on by a lamp control circuit 88, which controls to turn on/off the lamp 82 in accordance with an instruction from the sequence control circuit 87. The lamp control circuit 88 also controls to turn on/off the light box 94 in accordance with an instruction from the sequence control circuit 87.

The carriage 81 is driven in the sub-scan direction by a carriage drive mechanism 89 using the stepping motor 90 as a driving source. The stepping motor 90 is driven by the sequence control circuit 87 in a corresponding rotational direction at a rotational speed set by the host computer 20.

The electrical signal output from the CCD 85 of the carriage 81 is input to an analog front end (AFE) 91. The analog front end 91 comprises an analog circuit including an A/D converter for sampling the electrical signal from the CCD 85 and converting it into a digital signal in synchronism with the drive clocks from the timing generator 86.

The digital signal output from the analog front end 91 is input to an image processing circuit 92, which generates image data by applying image processes such as shading correction, gamma correction, zoom process, and the like to the input digital signal. The image processes use the setup value set by the sequence control circuit 87. Upon executing the image processes, a buffer memory 93 is used as a work area, and stores image data that has undergone the image processes.

The image data stored in the buffer memory 93 is transferred to the host computer 20 via the image processing circuit 92 and interface control circuit 10. The interface control circuit 10 is an interface circuit complying with the USB (Universal Serial Bus) specification, and is connected to the host computer 20 via the USB cable 8.

The light box 94 comprises a rod-like cold cathode fluorescent tube, an inverter for turning on the cold cathode fluorescent tube, and a light guide for converting a linear light source formed by the cold cathode fluorescent tube into a surface-like uniform light source.

The image scanning apparatus 100 can scan a normal document (reflecting document), and a transparent document such as a film 95 or the like. Upon scanning the reflecting document, the apparatus 100 operates in the same manner as in the first embodiment. By contrast, upon scanning the transparent document, the light box 94 illuminates the film 95 held by the film holder 96, an image on the film 95 is formed on the CCD 85 by the imaging optical system 84 via an image scan window 96b (to be described later), and the formed optical image is converted into an electrical signal by the CCD 85.

Figure 11:
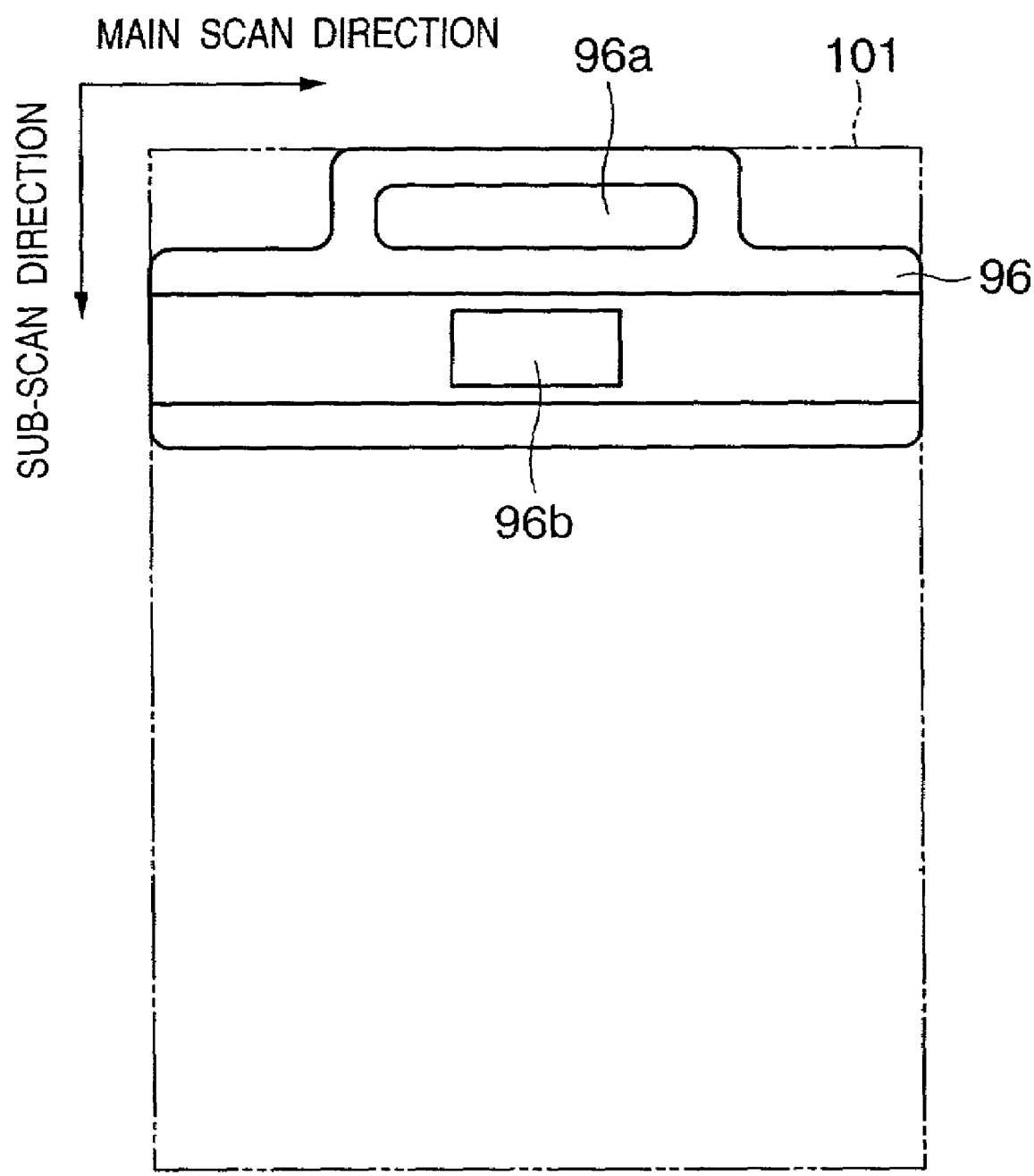
FIG. 11 is a diagram showing a film guide and a document scan range according to the second embodiment of the present invention.

FIG. 11 shows the film guide and a document scan range. Reference numeral 101 denotes a document scan range; 96, a film holder for holding a film; 96a, a shading aperture used to scan calibration data and shading data upon scanning a transparent document using the light box; and 96b, an image scan window for scanning a transparent document such as a film or the like. In this way, the film holder 96 has two apertures, i.e., the shading aperture 96a and image scan window 96b.

The amount of illumination light upon scanning a transparent document, an exposure value such as an exposure time or the like, and calibration data and shading data such as a gain setup value of the analog front end 91 and the like are generated on the basis of data scanned without any transparent document at the position of the shading aperture 96a.

Figure 12:
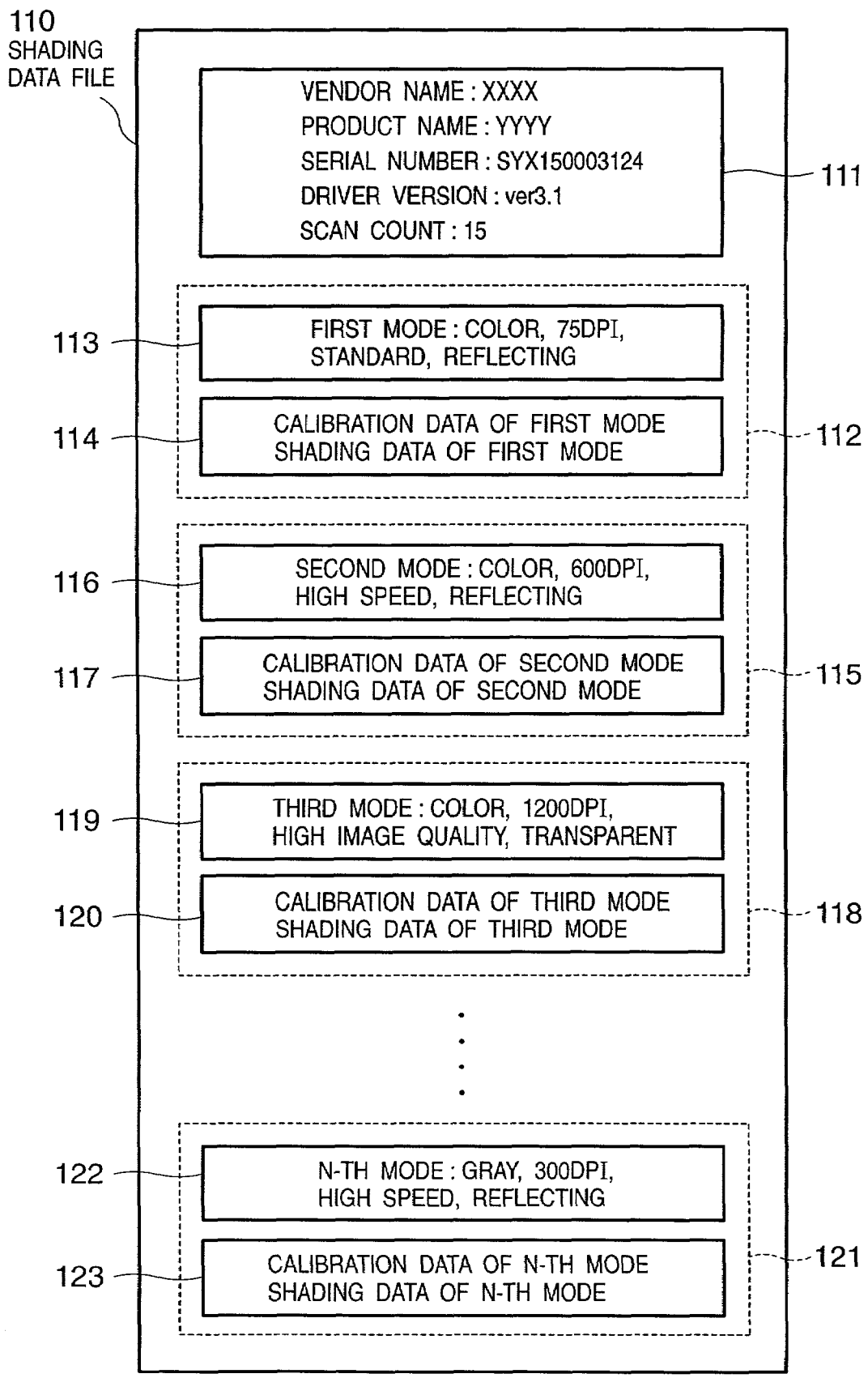
FIG. 12 shows a format of a shading data file according to the second embodiment of the present invention.

FIG. 12 shows the format of a shading data file.

The format shown in FIG. 12 is basically the same as that of the Shading Data File.dat shown in FIG. 7 in the first embodiment. A shading data file 110 comprises header information 111 of the file, and records 112, 115, 118, and 121 of shading data corresponding to respective scan modes. The record corresponding to each scan mode contains a sub-header that describes the scan mode, and calibration data and shading data corresponding to that scan mode.

The device driver 24 generates the shading data file 110. However, if a shading data file containing incompatible header information is found, that file is deleted.

In the example shown in FIG. 12, the first scan mode corresponds to a color scan, resolution of 75DPI, standard scan, and reflecting document, and the record 112 corresponding to the first scan mode comprises a header 113 corresponding to scan mode 1, and data 114 corresponding to scan mode 1.

The header information 111 contains a vendor name "XXXX", product name "YYYY", serial number "SYX150003124", driver version "ver3.1", and scan count "15", and can specify a compatible image scanning apparatus main body and driver version.

The header information 111 is used to determine if that shading data file 110 is compatible to the current device driver 24, prior to an image scan operation (to be described later).

These pieces of information are not compatible to items managed by the device driver 24, e.g., when the product name is different, when the serial number of the main body is different from that managed in the shading data file, when the driver version is different, or when the scan count is equal to or larger than a specific value. In such case, the device driver 24 deletes that file, and generates a new shading data file.

The scan count is counted up by the device driver 24 for each scan independently of the scan mode selected. This value is used to cope with shading of the illumination optical system, image sensing optical system, and image sensing element, and a change in luminance of the lamp 82 and a light source in the light box 94 as an elapse of time, and the device driver 24 deletes a shading data file when the scan count has reached, e.g., 100 (not limited to this number) In this manner, the calibration data and shading data are updated every time the scan count has reached 100. In place of deleting the shading data file, all records except for the header may be deleted.

The record 112 of the first scan mode consists of the header 113 and data 114. The header 113 contains "color", "75DPI", "standard scan", and "reflecting document", and specifies a scan mode corresponding to the data of this record.

Note that "standard scan" indicates that the CCD 85 uses a standard charge accumulation time.

At this time, calibration data of the data 114 corresponding to the first scan mode is a value associated with the gain of an amplifier for amplifying each color image signal. Note that the amplifier is incorporated in the analog front end 91. On the other hand, shading data of the first scan mode include dark shading correction data and white shading correction data corresponding to the first scan mode. The device driver 24 downloads these data onto the buffer memory 93 of the image scanning apparatus 100 via the image processing circuit 92 for each scan.

The second scan mode corresponds to "color", "600DPI", "high-speed scan", and "reflecting document", and the scan resolution is different from that of the first scan mode. The record 115 corresponding to the second scan mode contains a header 116 and data 117.

The third scan mode corresponds to "color", "1200DPI", "high image quality", and "transparent document", and is used to scan a transparent document such as a film or the like at high resolution. The record 118 corresponding to the third scan mode similarly contains a header 119 and data 120.

Note that the high image quality mode scans a film image with a high density for a relatively long charge accumulation time, and obtains an image which suffers less random noise.

The N-th scan mode corresponds to "grayscale", "300DPI", "high-speed scan", and "reflecting document", and scans to obtain a monochrome image at high speed. The record 121 corresponding to the N-th scan mode similarly contains a header 122 and data 123.

Note that the "high-speed scan" sets the charge accumulation time of the CCD 85 to be shorter than that of the standard scan so as to shorten the scan time.

In the high image quality scan mode or the high-speed scan mode, since the accumulation time of the CCD 85 is different from that of the standard scan, calibration data and shading data are different from those of the standard scan. Since the grayscale scan requires only monochrome image data, calibration data and shading data corresponding to, e.g., a green signal need only be prepared.

Figure 13:
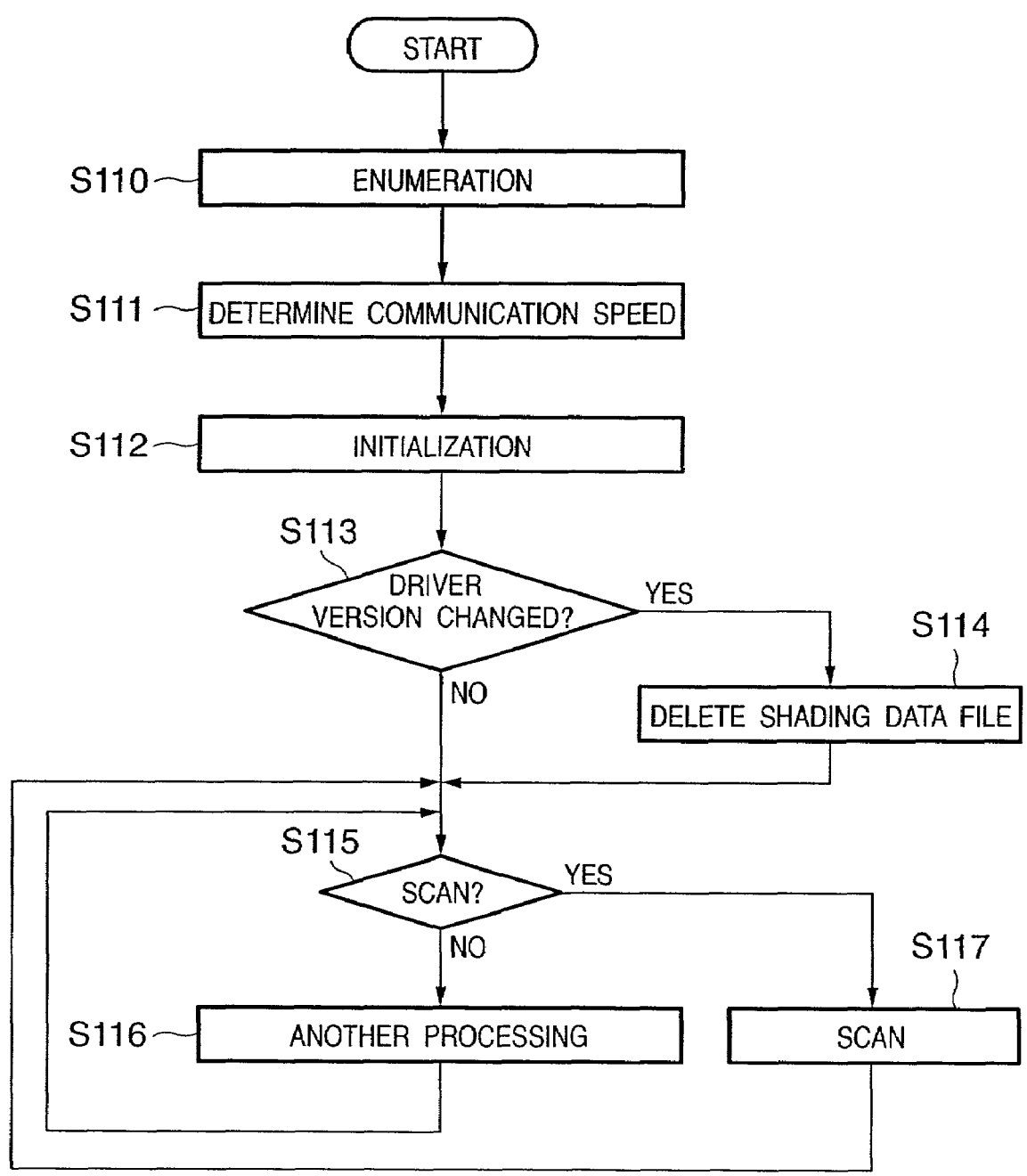
FIG. 13 is a flow chart showing the control sequence after a scanner control program is launched according to the second embodiment of the present invention.

FIG. 13 is a flow chart showing the control sequence after the scanner control program is launched. If the interface cable 8 is connected or the power switch of the host computer 20 is turned on, enumeration is done in step S110 to recognize a device connected to the USB interface 22 shown in FIG. 2, to assign addresses, and to determine the communication speed.

If the device driver 24 for the image scanning apparatus 100 is launched on the host computer 20, the device driver 24 measures an effective communication speed between the host computer 20 and image scanning apparatus 100 in step S111.

In step S112, the device driver 24 initializes the respective processing circuits of the image scanning apparatus 100 in accordance with the communication speed. The device driver 24 sets clocks based on the effective communication speed in the timing generator 86, and returns the carriage 81 to its home position.

It is checked in step S113 based on the driver version information in the header information 111 in the shading data file 110 if the driver version has been changed. If the driver version has been changed, the flow advances to step S114; otherwise, the flow advances to step S115.

In step S114, the current shading data file 110 is deleted, and the flow advances to step S115.

In step S115, the control waits for a command from the scan controller 27, i.e., it is checked if a scan command is issued. If the scan command is issued, the flow advances to step S117 to start a scan. The contents of the scan process will be described in detail later with reference to the flow chart shown in FIG. 14.

On the other hand, if the issued command is other than a scan command, the flow advances to step S116 to execute a process according to that command.

Figure 14:
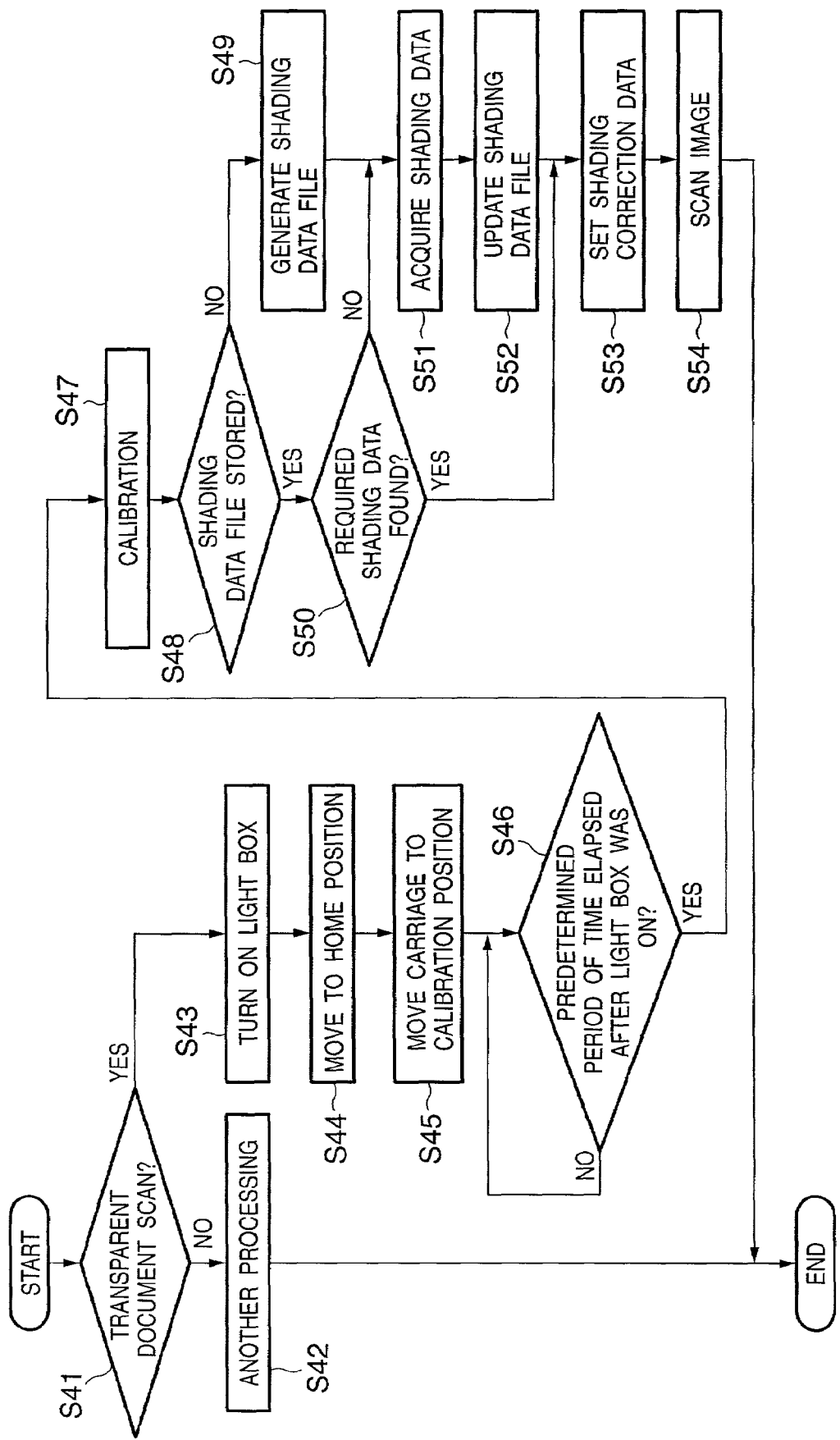
FIG. 14 is a flow chart showing a control sequence after a scan starts according to the second embodiment of the present invention.

FIG. 14 is a flow chart showing the control sequence after the scan start.

Upon receiving a command from the scan controller 27, the device driver 24 checks in step S41 if that command is a transparent document scan command. If the received command is not a transparent document scan command, the flow advances to step S42; otherwise, the flow advances to step S43.

If the received command is a reflecting document scan command, since the scan is done in step S42 in the same sequence as that in FIG. 9 in the first embodiment, a detailed description thereof will be omitted. If another command is received, a process is done according to that command.

If the command is a transparent document scan command (YES in step S41), the light box 94 is turned on (step S43), and the carriage 81 is moved to the home position (step S44). Then the carriage 81 is moved to a calibration position (step S45). It is checked if a predetermined period of time has elapsed after the light box 94 was turned on, and the control waits until the predetermined period of time elapses, so as to stabilize the amount of light emitted by the lamp (step S46). If the predetermined period of time has elapsed, the flow advances to step S47 to execute calibration. The flow then advances to step S48 to check if there is the shading data file 110. If there is, the flow advances to step S50; otherwise, the flow advances to step S49.

It is checked in step S50 if there is desired shading data. If there is, the flow advances to step S53; otherwise, the flow advances to step S51.

On the other hand, if there is not a shading data file (NO in step S48), the flow advances to step S49 to generate a shading data file 110. Shading data are then acquired (step S51), and a new record is added to the shading data file 110 to update the file (step S52). Shading correction data are written in the buffer memory 93 of the image scanning apparatus 100, and the image processing circuit 92 is set to make shading correction arithmetic operations (step S53). When the device driver 24 makes shading correction arithmetic operations, the shading correction data are stored in a memory area that the device driver 24 can directly access, so that they are used in the shading correction arithmetic operations.

When the apparatus is ready to scan, the flow advances to step S54, and the control is made to scan an image in the selected scan mode. In this case, the scan count contained in the header information of the shading data file is incremented by 1. The image scanning apparatus 100 starts a scan, and sends the scanned image data to the host computer 20. The device driver 24 makes arithmetic operations of the received image data in accordance with the processing contents set on the operation screen 31 to generate a final image file. Then, this processing ends.

As described above, according to the second embodiment, when the driver has been changed, a shading data file is re-generated, and when an image is scanned using the same setups in the second or subsequent scan, shading data are read out from the shading data file to execute the process. Hence, the scan time can be shortened without deteriorating the image quality.

Also, since calibration for correcting variations of black level of a signal due to the temperature characteristics or variations of the temperature characteristics of the lamp luminance is done for each scan, even when a transparent document with a broad dynamic range is scanned, high-quality image data can be obtained.

<Third Embodiment>

Figure 15:
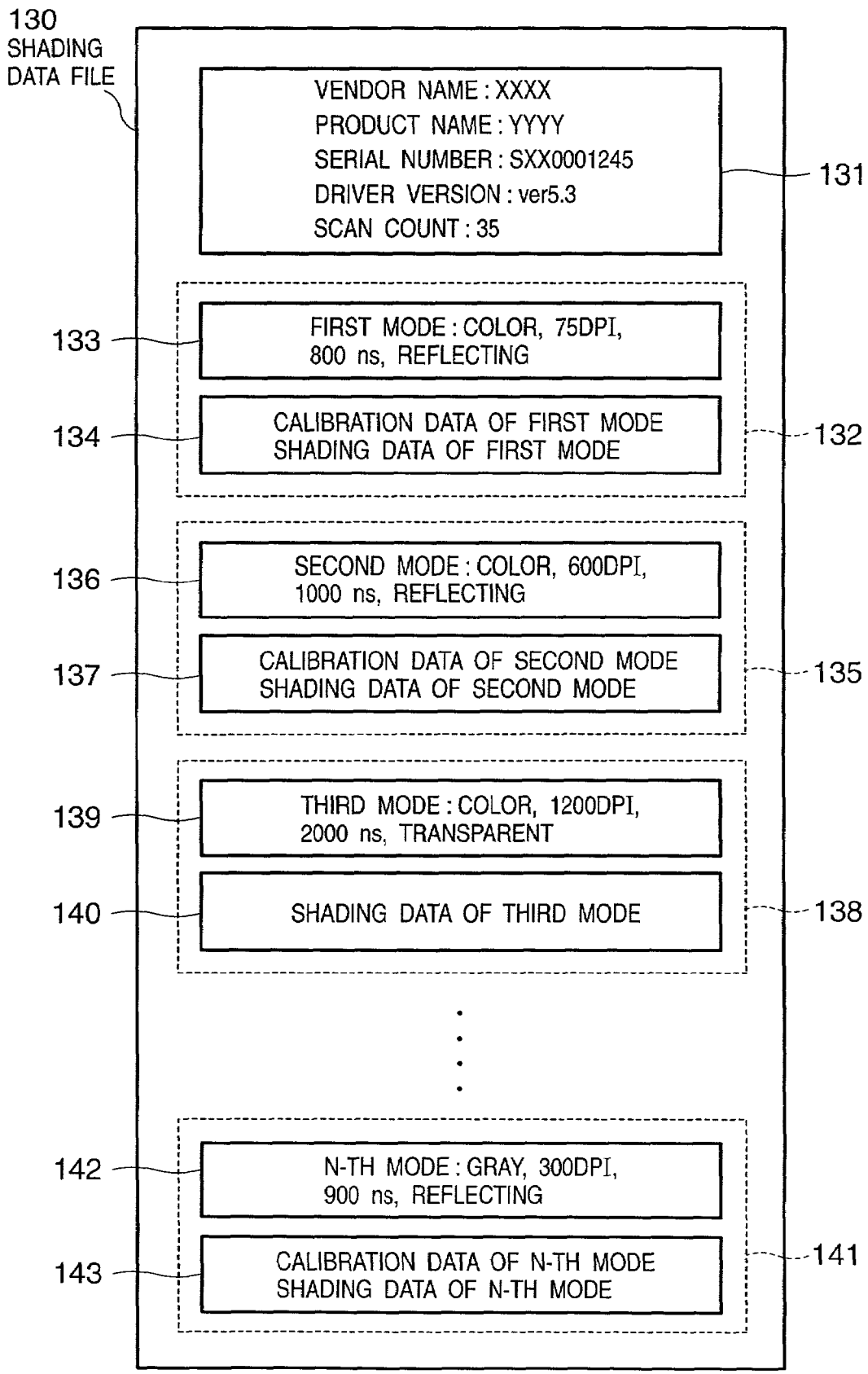
FIG. 15 shows a format of a shading data file according to a third embodiment of the present invention.

FIG. 15 shows the format of a shading data file used in an image scanning system according to the third embodiment. Since the hardware arrangement is the same as that in the second embodiment, a description thereof will be omitted. A shading data file 130 shown in FIG. 15 corresponds to an image scanning apparatus which executes calibration for each scan of a transparent document, and comprises header information 131, and a plurality of records 132, 135, 138, and 141 of shading data corresponding to respective scan modes. The records 132, 135, 138, and 141 respectively consist of sub-headers 133, 136, 139, and 142 which describe their scan modes, and data 134, 137, 140, and 143 corresponding to the scan modes.

The header information 131 of this file contains a vendor name "XXXX", product name "YYYY", serial number "SXX0001245", driver version "ver5.3", and scan count "35", and can specify a compatible scanner and its driver version.

In this shading data file 130, the records 132, 135, and 141 of the first, second, and N-th modes used to scan a reflecting document describe calibration data and shading data (data 134, 137, and 143). But the record 138 of the third mode used to scan a transparent document describes shading data (data 140) alone. In the shading data file 130, the headers 133, 136, 139, and 142 of the records 132, 135, 138, and 141 of the respective scan mode describe time values (800 ns, 1000 ns, 2000 ns, and 900 ns) directly indicating the drive clock periods of the CCD 85.

In the third embodiment, since calibration for a transparent document is done for each scan, no calibration data corresponding to the third scan mode is record.

Figure 16:
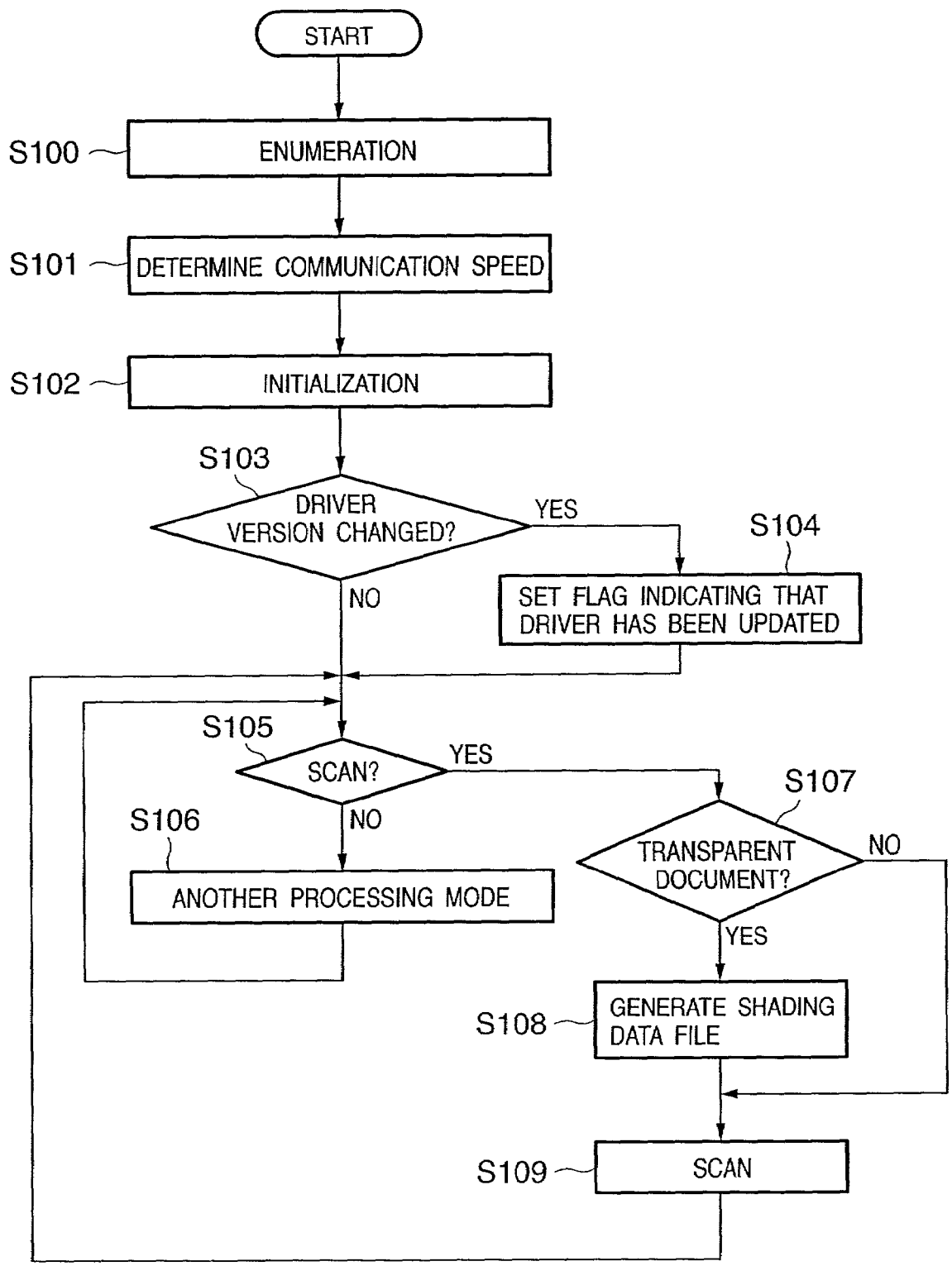
FIG. 16 is a flow chart showing a control sequence after a scanner control program is launched according to the third embodiment of the present invention.

FIG. 16 is a flow chart showing the control sequence after the scanner control program is launched in the third embodiment. If the interface cable 8 is connected or the power switch of the host computer 20 is turned on, enumeration is done to recognize a device connected to the USB interface 22, to assign addresses, and to determine the communication speed (step S100).

If the device driver 24 for the image scanning apparatus 100 is launched on the host computer 20, the device driver 24 measures an effective communication speed with the host computer 20 in step S101.

In step S102, the device driver 24 initializes the respective processing circuits of the image scanning apparatus 100 in accordance with the communication speed. The device driver 24 sets clocks based on the effective communication speed in the timing generator 86, and returns the carriage 81 to its home position.

It is then checked in step S103 based on the driver version information in the header information of the shading data file if the driver version has been changed. If the driver version has been changed the flow advances to step S104; otherwise, the flow advances to step S105.

In step S104, a driver change flag indicating that the driver has been changed is set, and the flow advances to step S105.

Subsequently, the control waits for a command from the scanner controller 27 in step S105, and it is checked if a scan command is issued. If the scan command is issued, it is checked in step S107 if the issued command is a reflecting or transparent document scan command. If the issued command is a transparent document scan command, the flow advances to step S108 to acquire shading data, and to generate a shading data file. At this time, the shading data file may be deleted and re-generated, or the current file may be updated. At this time, the driver version information is updated, the scan count is cleared to zero, and data associated with shading and calibration are partially changed or deleted. After that, the flow advances to step S109.

On the other hand, if the issued command is a reflecting document scan command, the flow advances to step S109. Since the contents of the scan process are the same as that in the flow chart shown in FIG. 14 of the second embodiment, a description thereof will be omitted. After the scan, the flow returns to step S105.

If the issued command is other than a scan command, the flow advances to step S106 to execute a process according to that command. After that, the flow returns to step S105.

According to the third embodiment as described above, since calibration is redone every time a transparent document is scanned, no calibration data need be saved in the shading data file 130 for the transparent document scan mode. Therefore, no calibration data need be stored in the shading data file for the transparent document scan mode, thus reducing the file size and the number of times of file access.

<Fourth Embodiment>

The fourth embodiment of the present invention will be described below.

Since an image scanning system according to the fourth embodiment is the same as that described in the second embodiment, a description thereof will be omitted.

The format of a shading data file held in the host computer 20 will be described below.

In this embodiment, two shading data files each having basically the same format as that shown in FIG. 7 of the first embodiment are held. For example, as the shading data files, the shading data file 110 shown in FIG. 12, and the shading data file 130 shown in FIG. 15 are held. These files allow to connect one of a plurality of image scanning apparatuses of different models, which are prepared in advance, to the host computer 20, and to scan the image by the connected image scanning apparatus. For example, when image scanning apparatus A is connected to scan an image, a device driver compatible to this image scanning apparatus A is selected, thus allowing image scanning apparatus A to scan an image; when image scanning apparatus B is connected to scan an image, a device driver compatible to this image scanning apparatus B is selected, thus allowing image scanning apparatus B to scan an image.

Since the control of the host computer 20 in the fourth embodiment is the same as the operation that has been explained above with reference to FIGS. 8, 9, or FIG. 13 or 16 and FIG. 14, a detailed description thereof will be omitted. In the fourth embodiment, it is checked in step S22 in FIG. 9 and step S48 in FIG. 14 if a shading data file compatible to the device driver 24 for the image scanning apparatus connected to the host computer 20 is available.

As described above, according to the fourth embodiment, even when a plurality of image scanning apparatuses of different models are used, the same effect as in the first embodiment can be obtained.

In the above description, shading data corresponding to the image scanning apparatus 100 which executes calibration upon each scan of a transparent document are managed using the shading data file 130, and the shading data file 110 (data with the format shown in FIG. 12) containing calibration data and shading data is used for an image scanning apparatus which does not execute calibration upon each scan of a transparent document. In this case, the process is done in the same sequence as that upon scanning a reflecting document in the first embodiment. More specifically, calibration is done only when the shading data file does not contain any calibration data corresponding to the selected scan mode.

Shading data even for a mode for scanning a transparent document such as a film or the like can be effectively acquired, and a shading data file compatible to the image scanning apparatus 100 can be easily generated if no shading data file compatible to the image scanning apparatus 100 is available.

In each of the above embodiments, the shading data file comprises header information, and records of shading data corresponding to respective scan modes. Each record consists of a sub-header that describes the scan mode, and data including calibration data and shading data corresponding to that scan mode. Alternatively, a shading data file having a different structure in place of the above file structure may be used. In this file, the header information contains a sub-header of each scan mode, and the sub-header is appended with address information of shading data.

Figure 17:
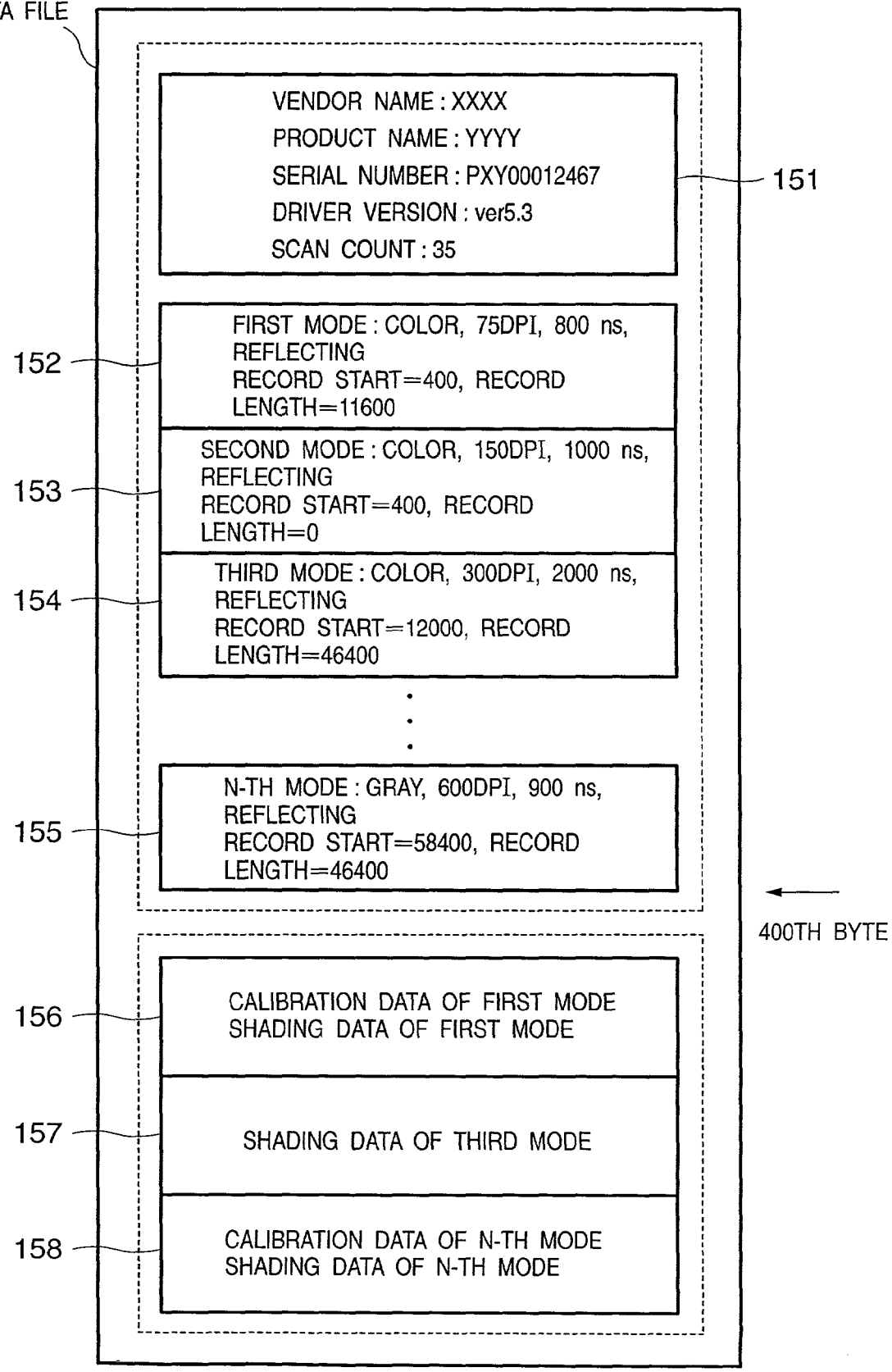
FIG. 17 shows a format of a shading data file according to a fourth embodiment of the present invention.

A shading data file 150 in FIG. 17 shows an example of such structure. In the shading data file 150, header information 151 contains headers 152, 153, 154, and 155 of respective scan modes, and the headers 152, 153, 154, and 155 are respectively appended with address information of shading data. For example, the sub-header 152 of the first scan mode describes the record start position and record length of calibration and shading data. In this example, calibration and shading data for the first scan mode are stored for 11600 bytes from the 400th byte position.

In the second scan mode, "0" is described as the record length of shading data. This indicates that no shading data is present for the second scan mode.

<Other Embodiment>

The present invention can be applied to a system constituted by a plurality of devices (e.g., host computer, interface, reader, printer) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts in FIG. 6 or 9, or FIG. 13 or 16 and 14 described in the embodiments.

The present invention is not limited to the above embodiments and various changes and modifications can be made within the spirit and scope of the present invention. Therefore to apprise the public of the scope of the present invention, the following claims are made.

What is claimed is:

1. An image scanning system capable of scanning an image in a plurality of scan modes, comprising:
    a memory adapted to store correction data for each of the plurality of scan modes and information indicating the scan count; and
    a controller adapted to update correction data stored in said memory when a scan count has reached a predetermined value, wherein said controller checks upon scanning an image if correction data corresponding to a scan mode of that image scan operation is stored in said memory, and if the correction data is not stored, controls to generate correction data corresponding to the scan mode, and to execute an image scan using the generated correction data.

2. The system according to claim 1, wherein the correction data is shading data.

3. The system according to claim 1, wherein the correction data includes calibration data and shading data.

4. The system according to claim 1, wherein said controller controls to store the generated correction data in said memory.

5. The system according to claim 1, wherein said memory further stores data of a model name of an image scanning apparatus and a driver version, and
    said controller checks if the model name of the image scanning apparatus stored in said memory matches a model name of an image scanning apparatus used, and if the driver version stored in said memory matches a driver version used, and when one of the checking results is negative, controls to generate new correction data corresponding to a scan mode without using the existing correction data to execute an image scan using the generated correction data, and to store the generated correction data in said memory.

6. The system according to claim 5, wherein said controller deletes the correction data stored in said memory when one of the checking results is negative.

7. The system according to claim 1, wherein the plurality of scan modes include a mode for scanning a transparent document, and
    said controller controls to generate correction data for each scan, to execute an image scan using the generated correction data, and to store the generated correction data in said memory when an image is scanned in the mode for scanning the transparent document.

8. The system according to claim 1, further comprising a selector for selecting a desired one of the plurality of scan modes.

9. The system according to claim 1, wherein said image scanning system is constructed by connecting to one of a plurality of different image sensing apparatuses, said memory stores the correction data file for each of the plurality of different image sensing apparatuses, and said controller independently controls for each of the plurality of different image sensing apparatuses.

10. An image scanning method in an image scanning system which can scan an image in a plurality of scan modes, and has a memory for storing correction data for each of the plurality of scan modes and information indicating the scan count, comprising:

updating correction data stored in the memory when a scan count has reached a predetermined value;

scanning an image in one of said plurality of scan modes;

correcting the scanned image using the correction data, stored in the memory, corresponding to the scan mode used in scanning the image;

checking upon scanning an image if correction data corresponding to a scan mode of that image scan operation is stored in said memory;

if the correction data is not stored, controlling to generate correction data corresponding to the scan mode; and executing an image scan using the generated correction.

11. The method according to claim 10, wherein the correction data is shading data.

12. The method according to claim 10, wherein the correction data includes calibration data and shading data.

13. The method according to claim 10, further comprising: a step of storing the generated correction data in the memory.

14. The method according to claim 10, wherein the memory further stores data of a model name of an image scanning apparatus and a driver version, and said method further comprises:

checking if the model name of the image scanning apparatus stored in the memory matches a model name of an image scanning apparatus used, and if the driver version stored in the memory matches a driver version used;

generating new correction data corresponding to a scan mode without using the existing correction data when one of the checking results is negative;

storing the generated correction data in the memory; and executing an image scan using the generated correction data.

15. The method according to claim 14, further comprising: deleting the correction data stored in the memory when one of the checking results is negative.

16. The method according to claim 10, wherein the plurality of scan modes include a mode for scanning a transparent document, and when an image is scanned in the mode for scanning the transparent document, said method comprises:

generating the correction data for each scan;

storing the generated correction data in the memory; and executing the image scan using the generated correction data.

17. The method according to claim 10, further comprising selecting a desired one of the plurality of scan modes.

18. The method according to claim 10, wherein the image scanning system is constructed by connecting to one of a plurality of different image sensing apparatuses, the memory stores the correction data file for each of the plurality of different image sensing apparatuses, and said updating of the correction data is independently executed for each of the plurality of different image sensing apparatuses.

19. A computer program product comprising a computer readable medium having computer readable program code means embodied in said medium for an image scanning method in an image scanning system which can scan an image in a plurality of scan modes, and has a memory for storing correction data for each of the plurality of scan modes and information including the scan count, said product including:

first computer readable program code means for updating correction data stored in the memory when a scan count has reached a predetermined value;

second computer readable program code means for generating correction data corresponding to the scan mode;

third computer readable program code means for checking upon scanning an image if correction data corresponding to a scan mode of that image scan operation is stored in said memory;

fourth computer readable program code means for, if the correction data is not stored, controlling to generate correction data corresponding to the scan mode; and fifth computer readable program code means for executing an image scan using the generated correction.

* * * * *